(12) United States Patent
Kato

(10) Patent No.: US 10,313,983 B2
(45) Date of Patent: Jun. 4, 2019

(54) WIRELESS COMMUNICATION DEVICE AND TRANSMISSION-POWER SETTING METHOD

(71) Applicant: Panasonic Intellectual Property Management Co., Ltd., Osaka (JP)

(72) Inventor: Osamu Kato, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/565,011

(22) PCT Filed: Feb. 25, 2016

(86) PCT No.: PCT/JP2016/001002
§ 371 (c)(1),
(2) Date: Oct. 6, 2017

(87) PCT Pub. No.: WO2016/181588
PCT Pub. Date: Nov. 17, 2016

(65) Prior Publication Data
US 2018/0103435 A1 Apr. 12, 2018

(30) Foreign Application Priority Data
May 8, 2015 (JP) .................................. 2015-096075

(51) Int. Cl.
*H04W 52/24* (2009.01)
*H04W 88/08* (2009.01)
(Continued)

(52) U.S. Cl.
CPC ....... *H04W 52/243* (2013.01); *H04W 52/228* (2013.01); *H04W 52/42* (2013.01);
(Continued)

(58) Field of Classification Search
CPC . H04W 52/00–52/60; H04W 72/0453; H04W 88/08; H04W 92/12
See application file for complete search history.

(56) References Cited

U.S. PATENT DOCUMENTS 5,893,035 A * 4/1999 Chen ..................... H04W 52/40
455/442
7,035,661 B1 * 4/2006 Yun ....................... H04W 52/42
370/277

(Continued)

FOREIGN PATENT DOCUMENTS

JP 10322774 A * 12/1998
JP 2011-130058 A 6/2011
(Continued)

OTHER PUBLICATIONS

International Search Report, dated May 17, 2016, corresponding to International Application No. PCT/JP2016/001002, 3 pages.
(Continued)

*Primary Examiner* — Raymond S Dean
(74) *Attorney, Agent, or Firm* — Seed IP Law Group LLP

(57) ABSTRACT

Provided is a wireless communication device which is capable of suppressing an increase in communication interference in wireless communication over a backhaul line, even if the number of installed wireless communication devices is increased. The wireless communication device communicates with a different wireless communication device over a wireless backhaul line in which a plurality of wireless communication schemes are mixed and used. The wireless communication device sets an initial value of transmission power related to data communication with the different wireless communication device, based on information on usage history of transmission power related to the data communication with the different wireless communication device.

20 Claims, 13 Drawing Sheets

(51) Int. Cl.
*H04W 92/12* (2009.01)
*H04W 52/22* (2009.01)
*H04W 72/04* (2009.01)
*H04W 52/42* (2009.01)
*H04W 52/50* (2009.01)

(52) U.S. Cl.
CPC ....... *H04W 52/50* (2013.01); *H04W 72/0453* (2013.01); *H04W 88/08* (2013.01); *H04W 92/12* (2013.01)

(56) References Cited

U.S. PATENT DOCUMENTS

| | | | | |
|---|---|---|---|---|
| 7,587,217 | B1* | 9/2009 | Laakso | H04W 52/225 370/318 |
| 8,483,618 | B1* | 7/2013 | Vargantwar | H04W 52/50 455/67.11 |
| 8,761,060 | B2 | 6/2014 | Patel et al. | |
| 2002/0077141 | A1* | 6/2002 | Hwang | H04W 52/143 455/522 |
| 2002/0160783 | A1 | 10/2002 | Holtzman et al. | |
| 2007/0109955 | A1* | 5/2007 | Moorti | H03G 3/3042 370/206 |
| 2010/0002656 | A1 | 1/2010 | Ji et al. | |
| 2010/0150000 | A1* | 6/2010 | Sakata | H04L 5/0007 370/252 |
| 2012/0039265 | A1 | 2/2012 | Patel et al. | |
| 2012/0142392 | A1 | 6/2012 | Patel et al. | |
| 2014/0135004 | A1 | 5/2014 | Patel et al. | |

FOREIGN PATENT DOCUMENTS

| | | |
|---|---|---|
| JP | 2013-520106 A | 5/2013 |
| WO | 02/069521 A1 | 9/2002 |

OTHER PUBLICATIONS

NTT DOCOMO, Inc. "DOCOMO 5G White Paper—5G Radio Access: Requirements, Concept and Technologies," Jul. 2014, 27 pages.

Seigo Nakao et al., "Activities on heterogeneous networks for 5G:—C-plane/U-plane Splitting Control in Heterogeneous Networks," *The Institute of Electronic, Information and Communication Engineers*, IEICE Technical Report, Oct. 2014, 8 pages. (With Partial English Translation).

Seiichi Sampei, " a Study on Technical Direction of Wireless Access and Netowrking for 5G Cellular Systems," *The Institute of Electronic, Information and Communication Engineers*, IEICE Technical Report, Oct. 2014, 8 pages. (With Partial English Translation).

* cited by examiner

FIG. 3

| SMALL CELL BASE STATION (SBS) | RADIO FREQUENCY | HISTORY OF COMMUNICATION DATA AMOUNT IN CERTAIN PERIOD IN PAST |
|---|---|---|
| | | DATA AMOUNT (MB) |
| SBS#1 | $f_1$ | 784 |
| | $f_2$ | 290 |
| | $f_3$ | 3681 |
| | $f_4$ | 19 |
| SBS#2 | $f_1$ | 208 |
| | $f_2$ | 34 |
| | $f_3$ | 0 |
| | $f_4$ | 4812 |
| ⋮ | ⋮ | ⋮ |
| SBS#10 | $f_1$ | 1960 |
| | $f_2$ | 3488 |
| | $f_3$ | 26 |
| | $f_4$ | 55 |

| SMALL CELL BASE STATION | RADIO FREQUENCY | TRANSMISSION POWER (dBm) FREQUENCY | |
|---|---|---|---|
| SBS#1 | $f_1$ | -6 dBm OR LESS | 0 |
| | | -6~-3dBm | 2 |
| | | -3~0dBm | 13 |
| | | 0~+3dBm | 165 |
| | | +3~+6dBm | 209 |
| | | +6~+9dBm | 780 |
| | | +9~+12dBm | 4918 |
| | | +12~+15dBm | 1130 |
| | | +15~+18dBm | 520 |
| | | +18~+21dBm | 46 |
| | $f_2$ | ... | |
| | $f_3$ | ... | |
| | $f_4$ | ... | |
| ... | ... | ... | |
| SBS#10 | $f_1$ | ... | |
| | $f_2$ | ... | |
| | $f_3$ | ... | |
| | $f_4$ | ... | |

| RADIO FREQUENCY | HISTORY OF COMMUNICATION DATA AMOUNT IN CERTAIN PERIOD IN PAST |
|---|---|
| | DATA AMOUNT (MB) |
| $f_1$ | 375 |
| $f_2$ | 180 |
| $f_3$ | 1683 |
| $f_4$ | 4 |

| RADIO FREQUENCY | TRANSMISSION POWER (dBm) | FREQUENCY |
|---|---|---|
| $f_1$ | -6 dBm OR LESS | 26 |
| | -6~-3dBm | 103 |
| | -3~0dBm | 110 |
| | 0~+3dBm | 97 |
| | +3~+6dBm | 265 |
| | +6~+9dBm | 3291 |
| | +9~+12dBm | 503 |
| | +12~+15dBm | 11 |
| | +15~+18dBm | 3 |
| | +18~+21dBm | 0 |
| $f_2$ | ... | |
| $f_3$ | ... | |
| $f_4$ | ... | |

WIRELESS COMMUNICATION DEVICE AND TRANSMISSION-POWER SETTING METHOD

TECHNICAL FIELD

The present disclosure relates to a wireless communication device and a transmission-power setting method.

BACKGROUND ART

When a terminal and a wireless base station perform wireless communication, the transmission power necessary for wireless communication needs to be determined. In the related art, apparatuses including a transmitter, a receiver, and a controller are known. The transmitter transmits a beacon on the beacon channel. The receiver receives a message including the channel quality of the beacon channel from an access terminal. The controller controls the transmission power of the transmitter, based on the received message (see, for example, PTL 1).

In recent years, a heterogeneous network has been studied in a wireless communication system in which a terminal and a wireless base station are connected over a network (see, for example, NPLs 1 to 3).

CITATION LIST

Patent Literature

PTL 1: PCT Japanese Translation Patent Publication No. 2013-520106

Non-Patent Literature

NPL 1: Seigo Nakao, Tetsuya Yamamoto, Shozo Okasaka, and Hidetoshi Suzuki, "Efforts on heterogeneous networks towards 5G—C-plane/U-plane separated heterogeneous network—", IEICE technical report, The Institute of Electronics, Information and Communication Engineers, October 2014, P 83-88

NPL 2: Seiichi Sampei, "A study on the direction of radio access network in fifth generation cellular system", IEICE technical report, The Institute of Electronics, Information and Communication Engineers, October 2014, P 153-P 158

NPL 3: "Docomo 5G white paper on requirements and technical concepts for 5G wireless access after 2020", NTT Docomo, September 2014, P 1-14

SUMMARY OF THE INVENTION

When applying the technique described in PTL 1 to communication in a plurality of wireless base stations connected over a wireless backhaul line, there is a possibility that as the number of installed wireless base stations increases, the communication interference increases.

The present disclosure has been made in view of the above circumstances, and an object of the present disclosure is to provide a wireless communication device and a power setting method, capable of suppressing an increase in communication interference in wireless communication over a backhaul line, even if the number of installed wireless communication devices is increased.

A wireless communication device of the present disclosure is a wireless communication device which communicates with a different wireless communication device over a wireless backhaul line in which a plurality of wireless communication schemes are mixed and used, and includes a processor that sets an initial value of transmission power related to data communication with the different wireless communication device, based on information on usage history of the transmission power related to the data communication with the different wireless communication device; and an antenna that performs data communication with the different wireless communication device, based on the set initial value of transmission power.

According to the present disclosure, it is possible to suppress an increase in communication interference in wireless communication over a backhaul line, even if the number of installed wireless communication devices is increased.

BRIEF DESCRIPTION OF DRAWINGS

FIG. 3 is a schematic diagram showing an example of a history database retaining information on usage history of radio frequencies used for downlink communication.

FIG. 4 is a schematic diagram showing an example of a history database retaining information on usage history of transmission power used for the downlink communication.

FIG. 5 is a schematic diagram showing an example of a history database retaining information on usage history of radio frequencies used for uplink communication.

FIG. 6 is a schematic diagram showing an example of a history database retaining information on usage history of transmission power used for the uplink communication.

DESCRIPTION OF EMBODIMENTS

Hereinafter, exemplary embodiments will be described with reference to the drawings as appropriate. However, detailed descriptions more than necessary may be omitted in some cases. For example, detailed descriptions of already well-known matters and duplicate descriptions for substantially the same components may be omitted in some cases. This is to facilitate the understanding of those skilled in the art, by avoiding the following description from being unnecessarily redundant. In addition, the accompanying drawings and the following description are provided in order to help those skilled in the art fully understand the present disclosure, and are not intended to limit the subject described in claims.

Background to the Achievement of One Aspect of the Present Disclosure

In fifth generation mobile communication (5G), a wireless communication system is configured to include a macrocell base station and a small cell base station. Then, a heterogeneous network is formed in which wireless base stations having various wireless standards and cell radii are mixed.

It is expected that efficient installation of the backhaul line becomes important when the installation surface density of the small cell base station becomes high. The backhaul line includes, for example, a line between a small cell base station and a macrocell base station, or a line between a small cell base station and a backbone network. From the viewpoint of stability of communication quality of the backhaul line, an optical line is effective as the backhaul line. On the other hand, from the viewpoint of the economy and rapidity of the installation of the backhaul line, a wireless line is effective as the backhaul line.

When the backhaul line connecting a plurality of wireless base stations is wireless and a number of wireless base stations are installed, it is important to properly manage the transmission power when the wireless base station performs data communication. In a case where the transmission power is excessive, there is a possibility that communication interference may occur at various places in the wireless backhaul line which is a heterogeneous network.

Hereinafter, a description will be made about a wireless communication device and a transmission-power setting method, capable of suppressing an increase in communication interference in wireless communication over a backhaul line, even if the number of installed wireless communication devices is increased.

First Exemplary Embodiment

Figure 1:
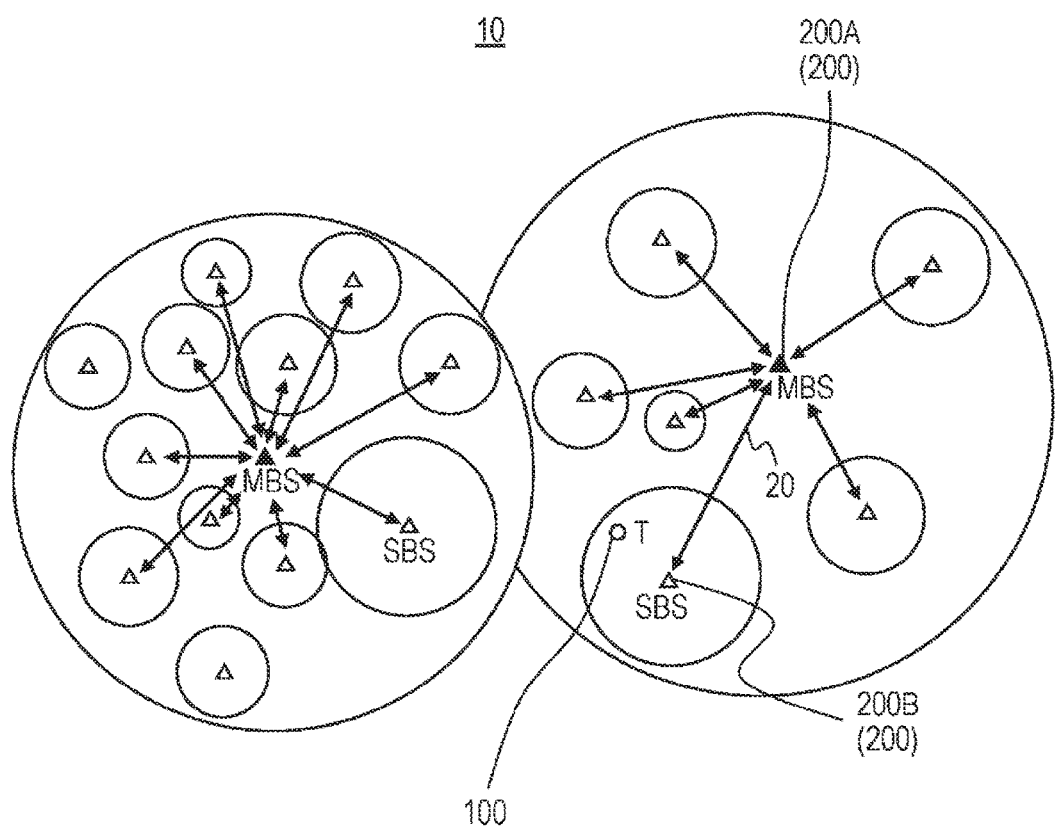
FIG. 1 is a schematic diagram showing a configuration example of a wireless communication system in a first exemplary embodiment.

[Configuration and Others]
FIG. 1 is a block diagram showing a configuration example of wireless communication system 10 in a first exemplary embodiment. Wireless communication system 10 includes plural base stations 200. Plural base stations 200 are connected over wireless backhaul line 20. Plural small cell base stations 200B communicate with macrocell base station 200A over wireless backhaul line 20.

Wireless communication system 10 is a heterogeneous network in which base stations 200 have various wireless standards. Base station 200 can also communicate with terminal 100. In the heterogeneous network, base stations 200 having different wireless communication schemes (for example, Radio Access Technology (RAT)) or different cell radii are mixed. In the heterogeneous network, for example, plural types of radio standards are mixed, and base stations 200 with different cell radii are mixed geographically. The RAT includes, for example, wireless communication standards, radio frequencies, and information on directivity formation during communication.

This heterogeneous network may not be a C/U separation type network, or may be the C/U separation type network. That is, in wireless communication system 10, the communication related to the control data and the communication related to the user data may be performed by same base station 200, or may be performed by different base stations 200. The user data is transmitted between macrocell base station 200A and small cell base stations 200B over wireless backhaul line 20 in a case where terminals 100 are connected to small cell base stations 200B in user plane.

Base station 200 includes macrocell base station 200A and small cell base station 200B. Terminal 100 communicates control data and user data with any of macrocell base station 200A and small cell base station 200B. The control data includes data relating to Control (C)-Plane. The user data includes data relating to User (U)-Plane. The user data includes, for example, image data (for example, moving image and still image) and audio data, and can include data having a large volume.

The C-plane is a communication protocol for communicating the control data for call connection or radio resource allocation in wireless communication. The U-plane is a communication protocol for actually performing communication (for example, video communication, audio communication, and data communication) using the allocated radio resources.

The cell radius of macrocell base station 200A is, for example, 1 km to several km, which is relatively large. For example, one type (for example, LTE) or a plurality of types of RATs that can be adopted by macrocell base station 200A may be used. The cell radius corresponds to the maximum transmission distance of base station 200.

The cell radius of small cell base station 200B is, for example, 10 m to 100 m, which is relatively small. The RATs that can be adopted by small cell base station 200B are diverse, and there are multiple types of RATs. For example, the cell radius may be 100 m or more in the mountains, the desert area, and the forest area, or may be larger than the cell radius of macrocell base station 200A. That is, here, the distinction between macrocell base station 200A and small cell base station 200B may be performed regardless of the size of the cell radius.

In FIG. 1, "MBS" indicates macrocell base station 200A, "SBS" (Δ) indicates small cell base station 200B, and "T" indicates terminal 100. A line surrounding macrocell base station 200A indicates an image of the communication coverage area by macrocell base station 200A. A line surrounding small cell base station 200B indicates an image of the communication coverage area by small cell base station 200B. The communicable coverage area of base station 200 is determined, for example, according to the position and the cell radius of base station 200.

Base station 200 sets a RAT to be used for communication, from among the RATs (for example, the wireless communication standard and the radio frequency) that can be adopted by base station 200, and performs wireless communication according to the set RAT. Base station 200 can adopt one or more RATs.

The wireless communication standard includes, for example, Long Term Evolution (LTE), Wireless Local Area Network (LAN), Digital Enhanced Cordless Telecommunication (DECT), 3rd generation mobile communication system (3G), fourth generation mobile communication system (4G), fifth generation mobile communication system (5G).

Specific information of RAT includes, for example, the following RAT 1 to RAT 5. RAT 1 is, for example, LTE with a radio frequency band of 700 MHz to 3 GHz. RAT 2 is, for example, LTE-Advanced with a radio frequency band of 15 GHz. RAT 3 is, for example, wireless LAN communication with a radio frequency band of 5 GHz. RAT 4 is, for example, a wireless communication scheme with a radio frequency band of 15 GHz band, and is a fifth generation mobile communication system. RAT 5 is, for example, a wireless communication scheme (for example, millimeter-wave communication) (for example, WiGig) with a radio frequency band of 60 GHz band.

Figure 2:
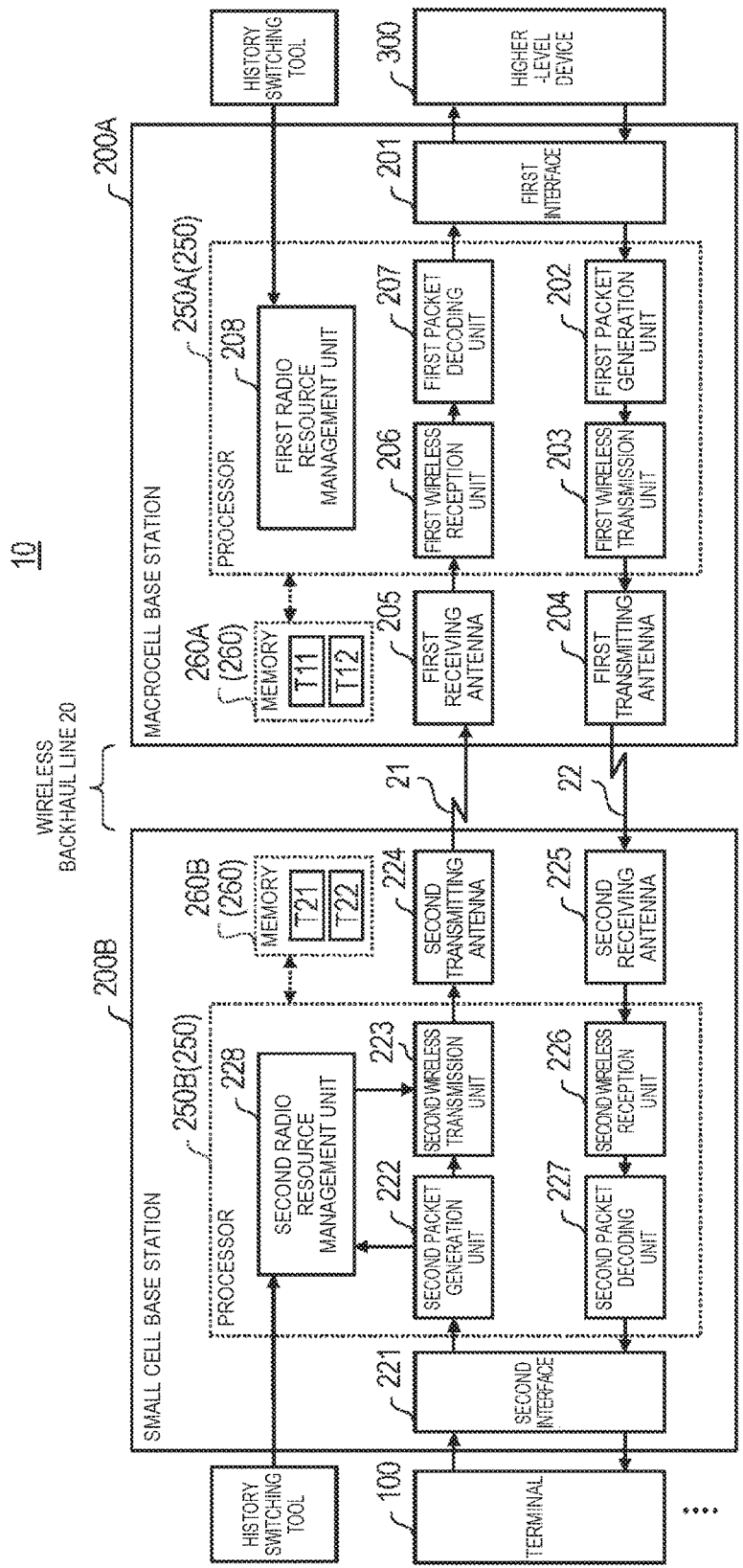
FIG. 2 is a block diagram showing a configuration example of a macrocell base station and a small cell base station in the first exemplary embodiment.

FIG. 2 is a block diagram showing a configuration example of macrocell base station 200A and small cell base station 200B.

Macrocell base station 200A and small cell base station 200B are connected over wireless backhaul line 20. Wireless backhaul line 20 includes uplink 21 and downlink 22. Uplink 21 is a wireless line heading from small cell base station 200B to macrocell base station 200A in wireless backhaul line 20. Downlink 22 is a wireless line heading from macrocell base station 200A to small cell base station 200B in wireless backhaul line 20. Wireless lines broadly include various public lines, mobile phone lines, wide area wireless lines, and the like.

Macrocell base station 200A has one or plural small cell base stations 200B existing around macrocell base station 200A as a communication partner. Small cell base station 200B has one macrocell base station 200A as a communication partner. Since macrocell base station 200A and small cell base station 200B are fixedly installed, the communication partners of macrocell base station 200A and small cell base station 200B are determined in advance.

Macrocell base station 200A includes processor 250A, memory 260A, first interface 201, first transmitting antenna 204, and first receiving antenna 205.

Processor 250A cooperates with memory 260A to perform various processes and controls. Specifically, processor 250A implements the function of each of the following units by executing the program stored in memory 260A. The units include first packet generation unit 202, first wireless transmission unit 203, first wireless reception unit 206, first packet decoding unit 207, and first radio resource management unit 208.

Memory 260A stores, for example, various data, information, and programs. Memory 260A stores history databases T11 and T12. Memory 260A may be built into processor 250A. Memory 260A may include a secondary storage device as well as a primary storage device. The temporary storage device includes, for example, a Random Access Memory (RAM) and a Read Only Memory (ROM). The secondary storage device includes, for example, a Hard Disk Memory (HDD) and a Solid State Drive (SSD). Memory 260A retains, for example, position information (for example, longitude and latitude) of each small cell base station 200B.

FIG. 3 is a schematic view showing an example of history database T11. History database T11 retains information on the usage history of the radio frequency used for communication of downlink 22 with macrocell base station 200A, for each small cell base station 200B which was connected in a wireless manner in the past. History database T11 may be provided separately for each RAT that can be adopted by macrocell base station 200A.

History database T11 retains, for example, information on small cell base station 200B and information on the usage history of the radio frequency in a certain period in the past. The information on small cell base station 200B includes identification information (for example, SBS#1) of small cell base station 200B. The information on the usage history of the radio frequency includes information on the radio frequency (for example, f1) used for communication with small cell base station 200B, and information on the communication amount (communication data amount) (for example, 784 (MB)) of communication using the radio frequency, in downlink 22.

FIG. 4 is a schematic view showing an example of history database T12. History database T12 retains information on the usage history of transmission power used for communication with small cell base station 200B, for each small cell base station 200B which was connected in a wireless manner in the past. History database T12 retains, for example, information on the usage history of transmission power in a certain period in the past. History database T12 may be provided separately for each RAT that can be adopted by macrocell base station 200A.

History database T12 retains, for example, information on small cell base station 200B and information on the usage history of transmission power in a certain period in the past. The information on small cell base station 200B includes identification information (for example, SBS#1) of small cell base station 200B. The information on the usage history of the transmission power is information on the transmission power (for example, −6 dBm to −3 dBm) at the radio frequency (for example, f1) used for communication with small cell base station 200B, and information on the frequency (for example, the number of times of communication) (for example, "2") of communication with small cell base station 200B using the transmission power, in downlink 22.

Here, the transmission power retained as the usage history may be the average value of the transmission power during communication (for example, the time average value every three seconds). The transmission power retained as the usage history may be, for example, a simple total value of the power to be supplied to each of antennas described later included in first transmitting antenna 204.

By using the average value of the transmission power as the information on the usage history of the transmission power, even in a case where the line status of wireless backhaul line 20 varies from moment to moment, history database T12 can hold the smoothed value of the change effect.

The average value of transmission power is roughly determined according to a radio frequency, a transmission distance, ambient environment, an antenna height, weather, and a wireless transmission method, for example. The ambient environment includes information such as whether buildings or mountains exist around base station 200 or not. Weather is taken into account for rain attenuation. High attenuation occurs when the diameter of raindrops overlaps with the wavelength of radio waves and radio waves are diffused. The higher the frequency of radio waves, the more the rain attenuation becomes prominent. In particular, in a case where radio waves of 10 GHz or more are used, it is greatly affected by rain attenuation.

First interface 201 is a communication interface for connecting macrocell base station 200A and a higher-level device. Examples of the higher-level device include a Serving Gateway (SGW) in a case where the RAT is LTE, a Serving General packet radio service support node (SGSN) in a case where the RAT is Wideband Code Division Multiple Access (W-CDMA).

First packet generation unit 202 generates a packet (first transmission packet) to be transmitted to small cell base station 200B. The first transmission packet includes the data of downlink 22. The data (control data and user data) of downlink 22 is obtained from, for example, memory 260, an external device (not shown) such as a storage device and a display device, and a processing unit (not shown) of various types of software.

First packet generation unit 202 transmits the information on the usage history of the radio resources for downlink 22 related to the communication of the first transmission packet, to first radio resource management unit 208. The information on the usage history of the radio resources includes, for example, information on the radio frequency used for communication with small cell base station 200B, and information on the communication amount of communication using the radio frequency.

In the present exemplary embodiment, the radio resources segregated and used for wireless backhaul line 20 include, for example, radio frequencies used for communication, and a part of the radio frequencies (a part of the frequency axis, a part of the time axis, or a combination thereof). A part of the frequency axis indicates, for example, a subcarrier frequency or a bundle of a plurality of subcarrier frequencies. A part of the time axis indicates, for example, a time slot or a bundle of a plurality of time slots.

First wireless transmission unit 203 refers to history database T12, derives the initial value of the transmission power to be used for communication with small cell base station 200B based on the usage history of the transmission power used for communication with small cell base station 200B in the past, and sets the initial value of the transmission power.

For example, first wireless transmission unit 203 determines the transmission power with a high usage history (high usage record) as the initial value of the transmission power used for communication of downlink 22. Transmission power with a high usage history may be, for example, transmission power with the highest frequency accumulated in history database T12, or may be transmission power with a frequency equal to or higher than a predetermined frequency, even though it is not the highest frequency.

First wireless transmission unit 203 updates the information on the usage history of the transmission power retained in history database T12, based on the transmission power used for the communication of the first transmission packet. The information on the usage history of the transmission power includes, for example, information on the transmission power used for communication of downlink 22 with small cell base station 200B, and information on the frequency of communication using the transmission power.

For example, with respect to the transmission power in history database T12 that matches the transmission power (the current transmission power) related to the transmission of the first transmission packet, first wireless transmission unit 203 adds, for example, "1" to the frequency, and updates the information retained in history database T12.

First wireless transmission unit 203 transmits the first transmission packet to small cell base station 200B through downlink 22 and first transmitting antenna 204. At this time, first wireless transmission unit 203 performs transmission using the radio resource allocated by first radio resource management unit 208 with the transmission power set by first wireless transmission unit 203.

First wireless transmission unit 203 transmits information (radio resource allocation information) on radio resources allocated for communication on downlink 22 including the control signal to small cell base station 200B. The radio resource allocation information for downlink 22 is used at reception on small cell base station 200B.

First wireless reception unit 206 receives the packet (second received packet) from small cell base station 200B, using the radio resource for uplink 21 allocated by first radio resource management unit 208.

First packet decoding unit 207 decodes the second received packet to obtain second decoded data. The second decoded data includes the data of uplink 21. The data (control data and user data) of uplink 21 is transferred to, for example, memory 260A, an external device (not shown) such as a storage device and a display device, and a processing unit (not shown) of various types of software.

Further, the data of downlink 22 includes the radio resource allocation information for downlink 22. First packet decoding unit 207 transmits the radio resource allocation information for downlink 22 to first radio resource management unit 208.

First packet decoding unit 207 transmits the information on the usage history of the radio resources related to the communication of the second received packet, to first radio resource management unit 208.

First radio resource management unit 208 refers to history database T11, and derives the allocation candidate for the radio frequency for downlink 22 to be used for communication with small cell base station 200B, based on the usage history of the radio frequency used for communication with small cell base station 200B in the past.

For example, first radio resource management unit 208 determines the radio frequency with a high usage history (high usage record) as the allocation candidate for the radio frequency to be allocated for communication of downlink 22. The radio frequency with a high usage history may be, for example, a radio frequency with the largest amount of communication accumulated in history database T11, or may be a radio frequency with a communication data amount equal to or greater than a predetermined amount, even though it is not the largest. A plurality of candidates ranging from a candidate having a high priority to a candidate of a low priority can be included as the candidates for the radio frequency.

First radio resource management unit 208 searches allocation status of resource blocks (RB) of the allocation candidates for the radio frequency to determine the presence or absence of an unallocated RB in the radio frequency.

In a case where there is an unallocated RB, first radio resource management unit 208 determines that this radio frequency can be allocated. First radio resource management unit 208 allocates radio resources (radio frequencies and unallocated RBs) which are determined as allocable, as radio resources to be used for communication of downlink 22 with small cell base station 200B.

First radio resource management unit 208 acquires the radio resource allocation information for uplink 21 from first packet decoding unit 207, and stores the radio resource allocation information for uplink 21, for example, in memory 260A for management. First radio resource management unit 208 allocates the radio resources for uplink 21, based on the radio resource allocation information for uplink 21.

In addition, first radio resource management unit 208 may designate Adaptive Modulation and Coding (AMC) as well as allocation of RB.

In a case where the allocation-candidate radio frequency cannot be allocated, first radio resource management unit 208 may change the radio frequency and select a new radio frequency from other allocation-candidate radio frequencies.

In addition, first radio resource management unit 208 acquires information on the usage history of radio resources from first packet generation unit 202. For example, first radio resource management unit 208 adds the communication amount included in the information on the usage history to the radio frequency in history database T11 that matches the radio frequency included in the acquired usage history information, and updates the information retained in history database T11.

First radio resource management unit 208 transmits information on the allocated radio resources for downlink 22, that is, information on the radio frequency and RB used for communication of downlink 22 with small cell base station 200B, to first wireless transmission unit 203.

First radio resource management unit 208 transmits information on the allocated radio resources for uplink 21, that is, information on the radio frequency and RB used for communication of uplink 21 with small cell base station 200B, to first wireless reception unit 206.

Small cell base station 200B includes processor 250B, memory 260B, second interface 221, second transmitting antenna 224, and second receiving antenna 225.

Processor 250B cooperates with memory 260B to perform various processes and controls. Specifically, processor 250B implements the functions of each of the following units by executing the program stored in memory 260B. The units include second packet generation unit 222, second wireless transmission unit 223, second wireless reception unit 226, second packet decoding unit 227, and second radio resource management unit 228.

Memory 260B stores, for example, various data, information, and programs. Memory 260B stores history databases T21 and T22. Memory 260B may be built into processor 250B. Memory 260B may include a secondary storage device as well as a primary storage device. Memory 260B retains, for example, position information (for example, longitude and latitude) of macrocell base station 200A.

FIG. 5 is a schematic view showing an example of history database T21. History database T21 retains information on the usage history of the radio frequency used for the communication of uplink 21 with macrocell base station 200A. History database T21 may be provided separately for each RAT that can be adopted by small cell base station 200B.

History database T21 retains, for example, information on the usage history of the radio frequency in a certain period in the past. The information on the usage history of the radio frequency includes information on the radio frequency (for example, f1) used for communication with macrocell base station 200A, and information on the communication amount (communication data amount) (for example, 375 (MB)) of communication using the radio frequency, in uplink 21.

FIG. 6 is a schematic view showing an example of history database T22. History database T22 retains information on the usage history of the transmission power used for the communication with macrocell base station 200A. History database T22 retains, for example, information on the usage history of transmission power in a certain period in the past. History database T22 may be provided separately for each RAT that can be adopted by small cell base station 200B.

The information on the usage history of the transmission power includes information on the transmission power (for example, −6 dBm to −3 dBm) at the radio frequency (f1) used for communication with connected macrocell base station 200A, and information on the frequency (for example, the number of times of communication) (for example, "103") of communication with macrocell base station 200A using the transmission power.

Here, the transmission power retained as the usage history may be the average value of the transmission power during communication (for example, the time average value every three seconds). The transmission power retained as the usage history may be, for example, a simple total value of the power input to each of antennas described later included in second transmitting antenna 224.

By using the average value of the transmission power as the information on the usage history of the transmission power, even in a case where the line status of wireless backhaul line 20 varies from moment to moment, history database T22 can retain the smoothed value of the change effect.

Since one macrocell base station 200A to which small cell base station 200B is connected is defined for small cell base station 200B, the identification information of macrocell base station 200A may not be retained in history databases T21 and T22.

Second interface 221 is a communication interface for connecting small cell base station 200B and terminal 100 under its control. Second interface 221 is an interface for communication through a Radio Access Network (RAN).

Second packet generation unit 222 generates a packet (second transmission packet) to be transmitted to macrocell base station 200A. The second transmission packet includes the data of uplink 21. The data (control data and user data) of uplink 21 is obtained from, for example, memory 260B, an external device (not shown) such as a storage device, and a processing unit (not shown) of various types of software.

Second packet generation unit 222 transmits the information on the usage history of the radio resources for uplink 21 related to the communication of the second transmission packet, to second radio resource management unit 228. The information on the usage history of the radio resources includes, for example, information on the radio frequency used for communication with macrocell base station 200A, and information on the communication amount of communication using the radio frequency.

Second wireless transmission unit 223 refers to history database T22, derives the initial value of the transmission power to be used for communication with macrocell base station 200A, based on the usage history of the transmission power used for communication with macrocell base station 200A in the past, and sets the initial value of the transmission power.

For example, second wireless transmission unit 223 determines the transmission power with a high usage history (high usage record) as the initial value of the transmission power used for communication of uplink 21. Transmission power with a high usage history may be, for example, transmission power with the highest frequency accumulated in history database T22, or may be transmission power with a frequency equal to or higher than a predetermined frequency, even though it is not the highest frequency.

Second wireless transmission unit 223 updates the information on the usage history of the transmission power retained in history database T22, based on the transmission power used for the communication of the second transmission packet. The information on the usage history of the transmission power includes, for example, information on the transmission power used for communication of uplink 21 with macrocell base station 200A, and information on the frequency of communication using the transmission power.

For example, with respect to the transmission power of history database T22 that matches the transmission power (the current transmission power) related to the transmission of the second transmission packet, second wireless transmission unit 223 adds, for example, "1" to the frequency, and updates the information retained in history database T22.

Second wireless transmission unit 223 transmits the second transmission packet to macrocell base station 200A through uplink 21 and second transmitting antenna 224. At this time, second wireless transmission unit 223 performs transmission using the radio resource allocated by second radio resource management unit 228 with the transmission power set by second wireless transmission unit 223.

Second wireless transmission unit 223 transmits information (radio resource allocation information) on radio resources allocated for communication on uplink 21 including the control signal to macrocell base station 200A. The radio resource allocation information for uplink 21 is used at reception on macrocell base station 200A.

Second wireless reception unit 226 receives the packet (first received packet) from macrocell base station 200A, using the radio resource for downlink 22 allocated by second radio resource management unit 228.

Second packet decoding unit 227 decodes the first received packet to obtain first decoded data. The first decoded data includes the data of downlink 22. The data (control data and user data) of downlink 22 is transferred to, for example, memory 260B, an external device (not shown) such as a storage device and a display device, and a processing unit (not shown) of various types of software.

Further, the data of uplink 21 includes the radio resource allocation information for uplink 21. Second packet decoding unit 227 transmits the radio resource allocation information for uplink 21 to second radio resource management unit 228.

Second packet decoding unit 227 transmits the information on the usage history of the radio resources related to the communication of the first received packet, to second radio resource management unit 228.

Second radio resource management unit 228 refers to history database T21, and derives the allocation candidate for the radio frequency for uplink 21 to be used for communication with macrocell base station 200A, based on the usage history of the radio frequency used for communication with macrocell base station 200A in the past.

For example, second radio resource management unit 228 determines the radio frequency with a high usage history (high usage record) as the allocation candidate for the radio frequency to be allocated for communication of uplink 21. The radio frequency with a high usage history may be, for example, a radio frequency with the largest amount of communication accumulated in history database T21, or may be a radio frequency with a communication data amount equal to or greater than a predetermined amount, even though it is not the largest. A plurality of candidates ranging from a candidate having a high priority to a candidate of a low priority can be included as the candidates for the radio frequency.

Second radio resource management unit 228 searches the allocation status of the RB which is the allocation candidate for the radio frequency, and determines the presence or absence of an unallocated RB in the radio frequency. In a case where there is an unallocated RB, second radio resource management unit 228 determines that this radio frequency can be allocated. Second radio resource management unit 228 allocates radio resources (radio frequencies and unallocated RBs) which are determined as allocable, as radio resources to be used for communication of uplink 21 with macrocell base station 200A.

Second radio resource management unit 228 acquires the radio resource allocation information for downlink 22 from second packet decoding unit 227, and stores the radio resource allocation information for downlink 22, for example, in memory 260B for management. First radio resource management unit 208 allocates the radio resources for downlink 22, based on the radio resource allocation information for downlink 22.

Second radio resource management unit 228 may designate the AMC as well as the allocation of RB.

In a case where the allocation-candidate radio frequency cannot be allocated, second radio resource management unit 228 may change the radio frequency and select a new radio frequency from the other allocation-candidate radio frequencies.

In addition, second radio resource management unit 228 acquires information on the usage history of radio resources from second packet generation unit 222. For example, second radio resource management unit 228 adds the communication amount included in the information on the usage history to the radio frequency in history database T21 that matches the radio frequency included in the acquired usage history information, and updates the information retained in history database T21.

Second radio resource management unit 228 transmits information on the allocated radio resources for uplink 21, that is, information on the radio frequency and RB used for communication of uplink 21 with macrocell base station 200A, to second wireless transmission unit 223.

Second radio resource management unit 228 transmits information on the allocated radio resources for downlink 22, that is, information on the radio frequency and RB used for communication of downlink 22 with macrocell base station 200A, to second wireless reception unit 226.

[Operation and Others]

Next, an operation example of wireless communication system 10 will be described.

Figure 7:
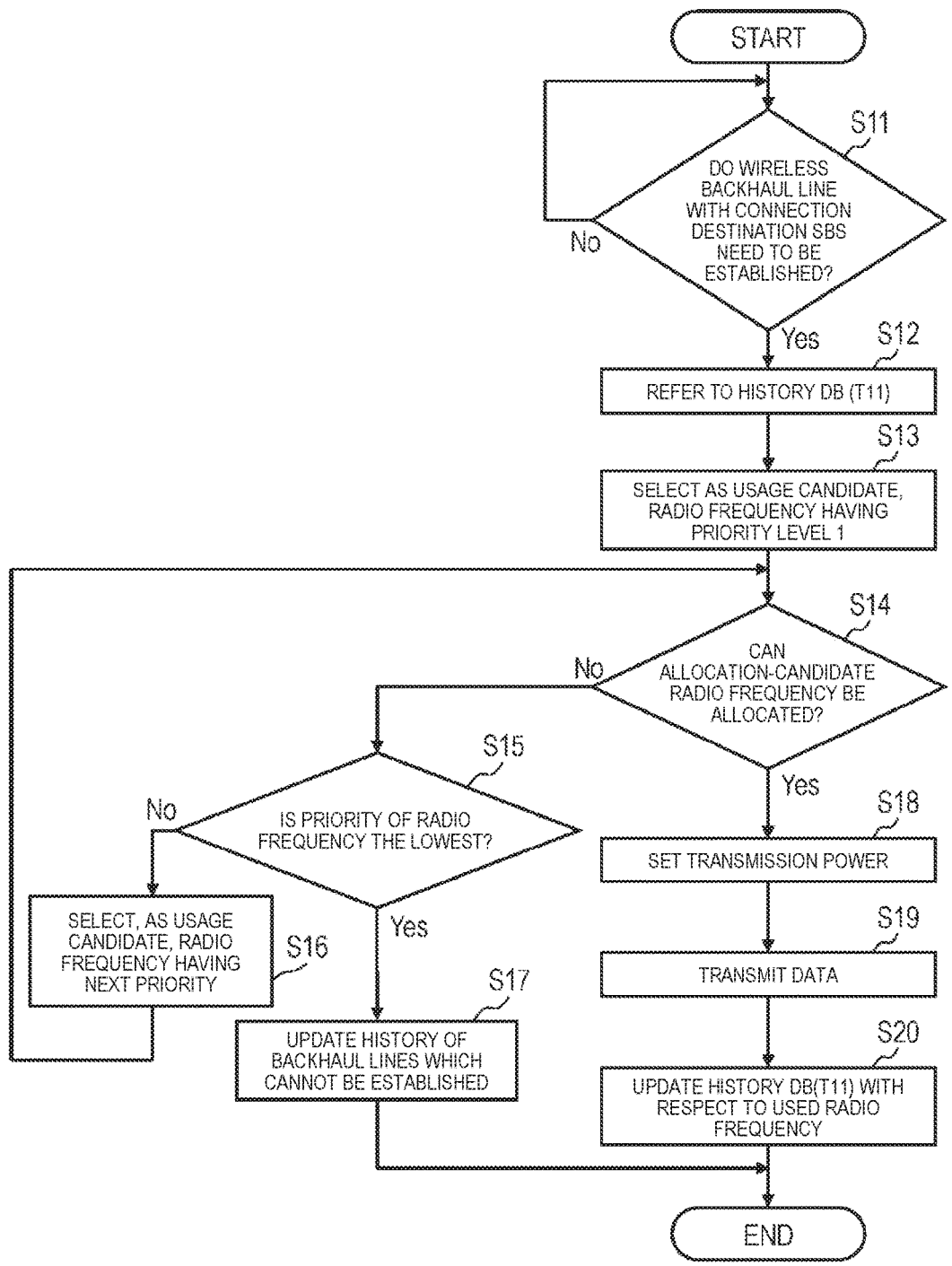
FIG. 7 is a flowchart showing a first operation example when allocating radio frequencies used by the base stations for communication over a wireless backhaul line.

FIG. 7 is a flowchart showing a first operation example when base station 200 allocates the radio frequency to be used in wireless backhaul line 20. FIG. 7 shows an operation example when macrocell base station 200A allocates the radio frequency to be used in downlink 22.

First, first radio resource management unit 208 determines whether or not various settings in wireless backhaul line 20 are necessary (S11). Examples of the various settings include setting of radio resources to be used in communication of wireless backhaul line 20 (downlink 22), and setting of an initial value of transmission power when communicating over wireless backhaul line 20 by first transmitting antenna 204. For example, in a case where there is terminal 100 under macrocell base station 200A or small cell base station 200B, first radio resource management unit 208 determines that the above various settings are necessary.

In a case where the above various settings are necessary, first radio resource management unit 208 refers to history database T11 (S12), and selects the radio frequency having a high usage frequency, at which the communication amount is the largest, or the like (usage history is high) in small cell base station 200B, as the allocation candidate for radio frequency (S13).

First radio resource management unit 208 determines whether or not an RB in an allocation candidate for radio frequency can be allocated, by the above-described method (S14).

In S14, in a case where the RB of the selected radio frequency cannot be allocated, first radio resource management unit 208 determines whether or not the priority of the allocation-candidate radio frequency is the lowest (S15).

For example, in a case where the process of S15 is performed at first time, for example, the priority of the allocation-candidate radio frequency is the highest, and each time the number of times of the process of S15 increases, the priority of the allocation-candidate radio frequency is lowered.

In a case where the priority of the radio frequency which is the allocation candidate is not the lowest in S15, first radio resource management unit 208 selects a radio frequency having a priority lower than the radio frequency by one level, that is, the radio frequency of the next highest priority, as the allocation candidate (S16). Then, macrocell base station 200A proceeds to the process of S14.

In a case where the priority of the allocation-candidate radio frequency is the lowest in S15, first radio resource management unit 208 registers impossible history information indicating that the setting of wireless backhaul line 20 is impossible, in history database T11 (S17). Examples of the impossible history information include information on small cell base station 200B which cannot perform allocation, the radio frequency which cannot be allocated, and the time (for example, date and time) at which allocation was impossible. Then, macrocell base station 200A ends the process of FIG. 7.

In S14, in a case where the RB of the radio frequency can be allocated, first radio resource management unit 208 allocates the RB of the allocatable radio frequency. Then, first radio resource management unit 208 sets transmission power (S18). The transmission power corresponds to the power supplied to first transmitting antenna 204. The setting of the transmission power may be performed by using history database T21 as in S32 to S35 shown in FIG. 9, or by a known method, for example.

First wireless transmission unit 203 communicates data with small cell base station 200B, with the set transmission power, using the RB of the allocated radio frequency (S19). The information on the allocated radio frequency is included in the radio resource allocation information for downlink 22 and is notified to small cell base station 200B.

When the data is communicated, first packet generation unit 202 transmits information on the amount of communication of the first transmission packet that has been transmitted, to first radio resource management unit 208. First radio resource management unit 208 updates the transmitted communication history (communication amount) in the radio frequency used in small cell base station 200B, in history database T11 (S20). Then, macrocell base station 200A ends the process of FIG. 7.

As described above, macrocell base station 200A is able to allocate a radio frequency with a low possibility of communication interference, by using the information on the usage history of the radio frequency in the past related to data communication. In a case where the RB of the allocation-candidate radio frequency cannot be allocated, the RB of another radio frequency is allocated, such that the possibility of finding the radio frequency at which macrocell base station 200A communicates data increases. That is, macrocell base station 200A can improve the allocation efficiency and utilization efficiency of radio resources. Therefore, macrocell base station 200A can autonomously segregate the radio frequency to be used for communication with small cell base station 200B over wireless backhaul line 20.

Figure 8:
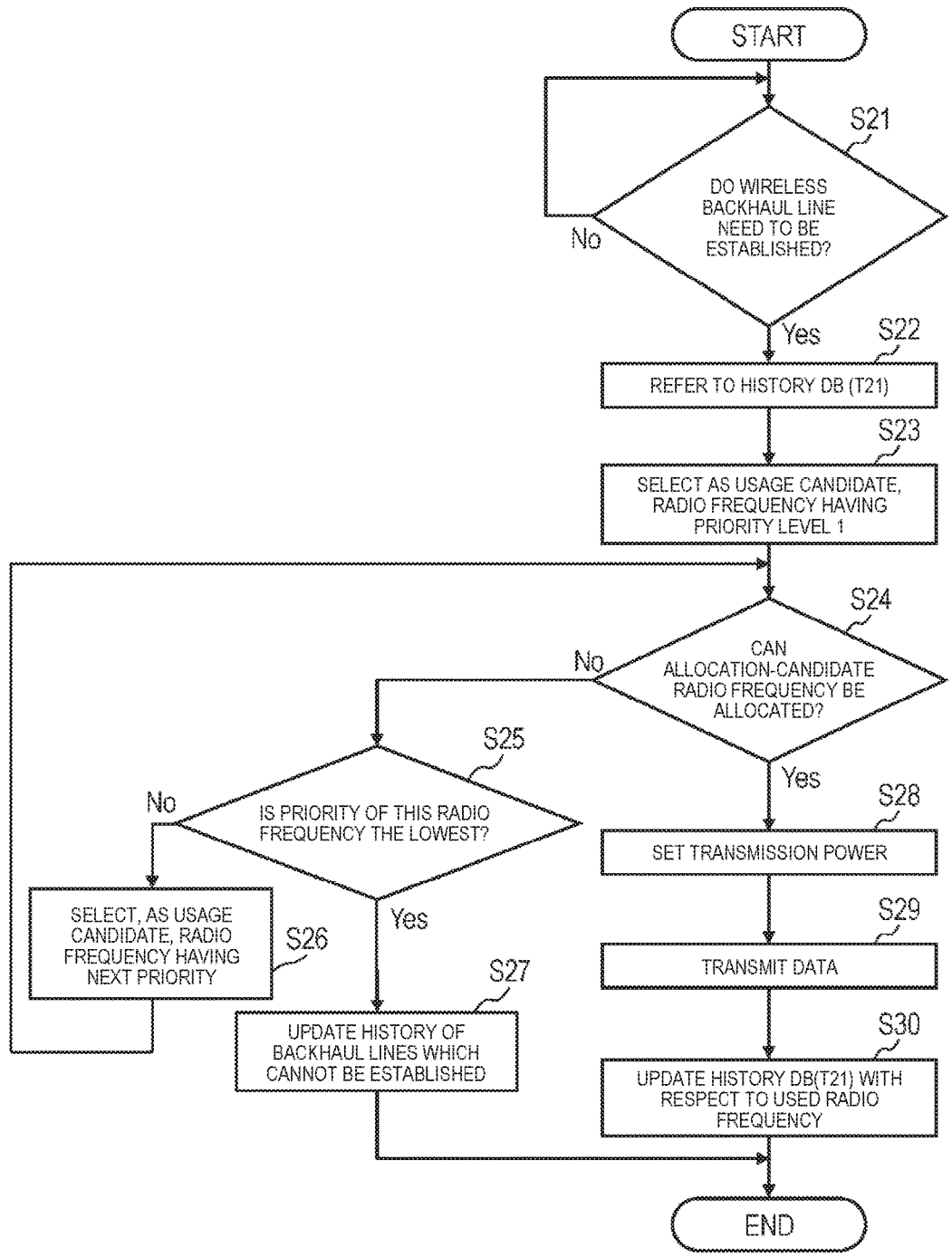
FIG. 8 is a flowchart showing a second operation example when allocating radio frequencies used by the base stations for communication over a wireless backhaul line.

FIG. 8 is a flowchart showing a second operation example when base station 200 allocates the radio frequency to be used in wireless backhaul line 20. FIG. 8 shows an operation example when small cell base station 200B allocates the radio frequency to be used in uplink 21. In FIG. 8, processes similar to those in FIG. 7 are denoted by the same reference numerals, and descriptions thereof are omitted or simplified.

First, second radio resource management unit 228 determines whether or not various settings in wireless backhaul line 20 are necessary (S21). The various settings include, for example, setting of radio resources to be used in communication of wireless backhaul line 20 (uplink 21), and setting of an initial value of transmission power when communicating over wireless backhaul line 20 by second transmitting antenna 224. Second radio resource management unit 228 determines that the above various settings are necessary, in a case where there is terminal 100 under macrocell base station 200A or small cell base station 200B, for example.

In a case where the above various settings are necessary, second radio resource management unit 228 refers to history database T21 (S22), and selects the radio frequency having a high usage frequency, at which the communication amount is the largest (usage history is high) as the allocation candidate for radio frequency (S23).

Second radio resource management unit 228 determines whether or not an RB in an allocation candidate for radio frequency can be allocated, by the above-described method (S24).

In S24, in a case where the RB of the selected radio frequency cannot be allocated, second radio resource management unit 228 determines whether or not the priority of the allocation-candidate radio frequency is the lowest (S25).

For example, in a case where the process of S25 is performed at first time, for example, the priority of the allocation-candidate radio frequency is the highest, and each time the number of times of the process of S25 increases, the priority of the allocation-candidate radio frequency is lowered.

In a case where the priority of the allocation-candidate radio frequency is not the lowest in S25, second radio resource management unit 228 selects a radio frequency having a priority lower than the radio frequency by one level, that is, the radio frequency of the next highest priority, as the allocation candidate (S26). Then, small cell base station 200B proceeds to the process of S24.

In a case where the priority of the allocation-candidate radio frequency is the lowest in S25, second radio resource management unit 228 registers impossible history information that the setting of wireless backhaul line 20 is impossible, in history database T21 (S27). Examples of the impossible history information include information on the radio frequency which cannot be allocated, and the time (for example, date and time) at which allocation was impossible. Then, small cell base station 200B ends the process of FIG. 8.

In S24, in a case where the RB of the radio frequency can be allocated, second radio resource management unit 228 allocates the RB of the allocatable radio frequency. Second radio resource management unit 228 sets transmission power (S28). The transmission power corresponds to the power supplied to second transmitting antenna 224. The setting of the transmission power may be performed by using history database T22 as in S42 to S45 shown in FIG. 10, or by a known method, for example.

Second wireless transmission unit 223 communicates data with macrocell base station 200A, with the set transmission power, using the RB of the allocated radio frequency (S29).

The information on the allocated radio frequency and RB is included in the radio resource allocation information for uplink 21 and is notified to macrocell base station 200A.

When the data is communicated, second packet generation unit 222 transmits information on the amount of communication of the second transmission packet that has been transmitted, to second radio resource management unit 228. Second radio resource management unit 228 updates the communication history (communication amount) with the used radio frequency in history database T21 (S30). Then, small cell base station 200B ends the process of FIG. 8.

As described above, small cell base station 200B is able to allocate a radio frequency with a low possibility of communication interference, by using the information on the usage history of the radio frequency in the past related to data communication. In a case where the RB of the allocation-candidate radio frequency cannot be allocated, the RB of another radio frequency is allocated, such that there is a high possibility of being able to find the radio frequency at which small cell base station 200B communicates data. That is, small cell base station 200B can improve the allocation efficiency and utilization efficiency of radio resources. Therefore, small cell base station 200B can autonomously segregate the radio frequency to be used for communication with macrocell base station 200A over wireless backhaul line 20.

Figure 9:
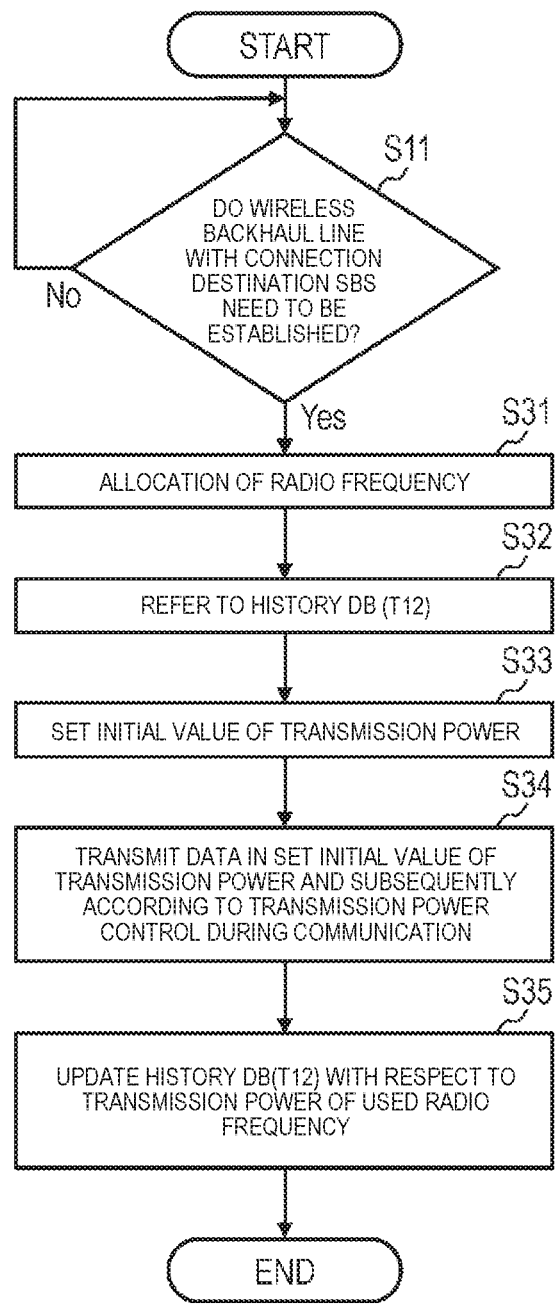
FIG. 9 is a flowchart showing a first operation example when determining transmission powers used by the base stations for communication over the wireless backhaul line.

FIG. 9 is a flowchart showing a first operation example when base station 200 sets the transmission power to be used for communication over wireless backhaul line 20. FIG. 9 shows an operation example when macrocell base station 200A sets transmission power. In FIG. 9, processes similar to those in FIGS. 7 and 8 are denoted by the same reference numerals, and descriptions thereof are omitted or simplified.

First, first radio resource management unit 208 determines whether or not various settings in wireless backhaul line 20 are necessary (S11).

In a case where various settings are necessary, first radio resource management unit 208 allocates radio resources including radio frequency for downlink 22 (S31). The allocation of radio resources may be performed by using history database T11 as in S12 to S17 shown in FIG. 7, or by a known method.

First wireless transmission unit 203 refers to history database T12 (S32), and sets the transmission power with high usage frequency such as the highest frequency (usage history is high), as the initial value of the transmission power of the communication using first transmitting antenna 204 (S33). This frequency is the frequency of the transmission power used in the radio frequency used for communication with small cell base station 200B.

First wireless transmission unit 203 may set the transmission power which is larger by 3 dB or the transmission power which is smaller by 3 dB than the most frequent transmission power at the allocated radio frequency, as the initial value of the transmission power, in history database T12.

First wireless transmission unit 203 transmits data of downlink 22 to small cell base station 200B, based on the set initial value of transmission power, through first transmitting antenna 204 (S34).

In S34, first wireless transmission unit 203 supplies the initial value of transmission power to first transmitting antenna 204 before data communication. First wireless transmission unit 203 supplies the transmission power determined by the transmission-power control during data communication to first transmitting antenna 204 during the data communication.

In the transmission-power control during the data communication, for example, if the reception power at the reception point (here, second receiving antenna 225) is equal to or more than a predetermined value, first wireless transmission unit 203 reduces the transmission power by first transmitting antenna 204 by a specified value (for example, 1 dB). On the other hand, if the reception power at the reception point (here, second receiving antenna 225) is equal to or less than the predetermined value, the transmission power by first transmitting antenna 204 is increased by a specified value (for example, 1 dB). Information on the reception power is notified from the reception side (here, small cell base station 200B) to the transmission side (here, macrocell base station 200A) through a reverse link (here, uplink 21).

When data is communicated in S34, first wireless transmission unit 203 accesses history database T12, and updates the frequency of the transmission power in the radio frequency used for communication with small cell base station 200B, based on the information on the used transmission power (S35). Then, macrocell base station 200A ends the process of FIG. 9.

As described above, macrocell base station 200A is able to set transmission power in which the degradation in the communication quality and the possibility of communication interference are low, by using the information on the usage history of the transmission power in the radio frequency in the past used for data communication. That is, since the initial value of the transmission power is set to be excessively small, the transmitted data does not reach small cell base station 200B, and macrocell base station 200A can suppress the quality of data communication from being reduced. Since the initial value of the transmission power is set to be excessively large, macrocell base station 200A can suppress the occurrence of communication interference in base station 200 or the like around small cell base station 200B. Therefore, macrocell base station 200A can autonomously segregate the transmission power to be used for communication with small cell base station 200B over wireless backhaul line 20.

Figure 10:
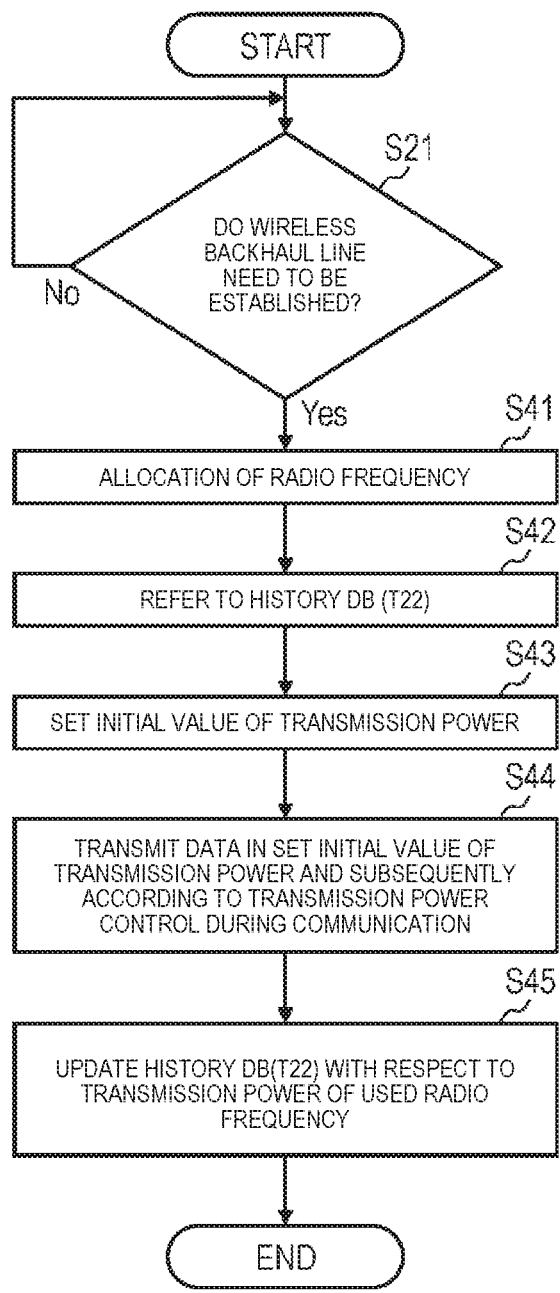
FIG. 10 is a flowchart showing a second operation example when determining transmission powers used by the base stations for communication over the wireless backhaul line.

FIG. 10 is a flowchart showing a second operation example when base station 200 sets the transmission power to be used for communication over wireless backhaul line 20. FIG. 10 shows an operation example when small cell base station 200B determines transmission power. In FIG. 10, processes similar to those in FIGS. 7 and 9 are denoted by the same reference numerals, and descriptions thereof are omitted or simplified.

First, second radio resource management unit 228 determines whether or not various settings in wireless backhaul line 20 are necessary (S21).

In a case where various settings are necessary, second radio resource management unit 228 allocates radio resources including radio frequency for uplink 21 (S41). The allocation of radio resources may be performed by using history database T21 as in S22 to S27 shown in FIG. 8, or by a known method.

Second wireless transmission unit 223 refers to history database T22 (S42), and sets the transmission power with high usage frequency such as the highest frequency (usage history is high), as the initial value of the transmission power of the communication using second transmitting antenna 224 (S43). This frequency is the frequency of the transmission power used in the radio frequency used for communication with macrocell base station 200A.

Second wireless transmission unit 223 transmits data of uplink 21 to macrocell base station 200A, based on the set initial value of transmission power, through second transmitting antenna 224 (S44).

In S44, second wireless transmission unit 223 supplies the initial value of transmission power to second transmitting antenna 224 before data communication. During the data communication, second wireless transmission unit 223 supplies the transmission power determined by the transmission-power control during data communication to second transmitting antenna 224.

In the transmission-power control during the data communication, for example, if the reception power at the reception point (here, first receiving antenna 205) is equal to or more than a predetermined value, first wireless transmission unit 203 reduces the transmission power by second transmitting antenna 224 by a specified value (for example, 1 dB). On the other hand, if the reception power at the reception point (here, first receiving antenna 205) is equal to or less than the predetermined value, the transmission power by second transmitting antenna 224 is increased by a specified value (for example, 1 dB). Information on the reception power is notified from the reception side (here, macrocell base station 200A) to the transmission side (here, small cell base station 200B) through a reverse link (here, downlink 22).

When data is communicated at S44, second wireless transmission unit 223 accesses history database T22, and updates the frequency of the transmission power in the radio frequency used for communication with macrocell base station 200A, based on the information on the used transmission power (S45). Then, small cell base station 200B ends the process of FIG. 10.

As described above, small cell base station 200B is able to set transmission power in which the degradation in the communication quality and the possibility of communication interference are low, by using the information on the usage history of the transmission power in the radio frequency in the past used for data communication. That is, since the initial value of the transmission power is set to be excessively small, the transmitted data does not reach macrocell base station 200A, and small cell base station 200B can suppress the quality of data communication from being reduced. Since the initial value of the transmission power is set to be excessively large, small cell base station 200B can suppress the occurrence of communication interference in base station 200 or the like around macrocell base station 200A. Therefore, small cell base station 200B can autonomously segregate the transmission power to be used for communication with macrocell base station 200A over wireless backhaul line 20.

[Control of Transmission Power]

Next, control of transmission power related to data communication will be described.

As shown in FIG. 11 to FIG. 14, first transmitting antenna 204, first receiving antenna 205, second transmitting antenna 224, and second receiving antenna 225 are antennas of Multiple-Input and Multiple-Output (MIMO). That is, each of first transmitting antenna 204, first receiving antenna 205, second transmitting antenna 224, and second receiving antenna 225 includes a plurality of antennas. The plurality of antennas may be provided physically or logically. FIGS. 11 to 14 illustrate that the number of MIMO antennas for transmission and the number of MIMO antennas for reception are respectively eight in macrocell base station 200A and small cell base station 200B.

Figure 11:
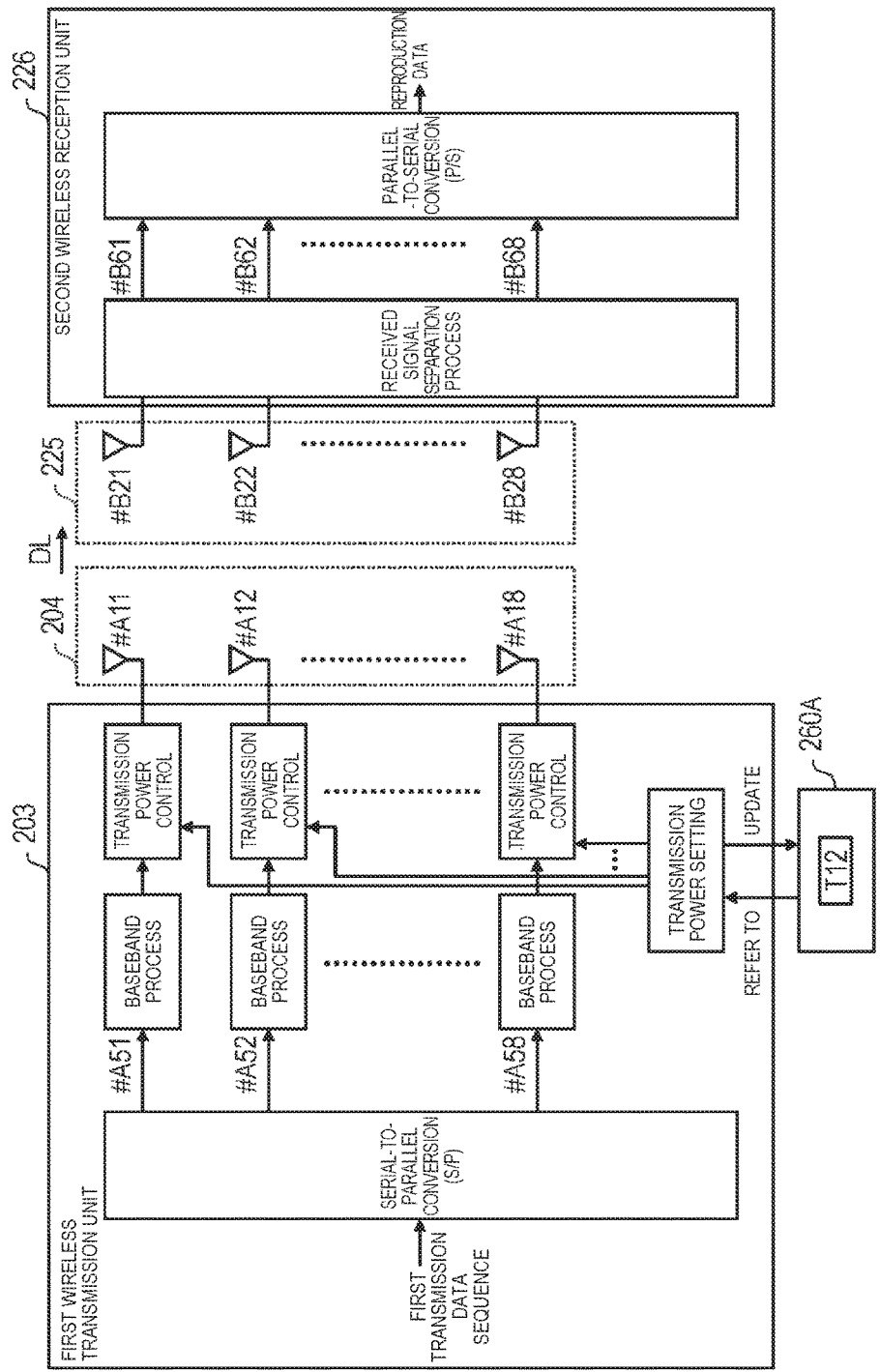
FIG. 11 is a schematic diagram for explaining a first control example of transmission power by a wireless communication system.

FIG. 11 is a schematic diagram for explaining a first control example of transmission power by wireless communication system 10. In FIG. 11, it is assumed that antennas #A11 to #A18 in first transmitting antenna 204 of macrocell base station 200A transmit different data. In this case, for example, antennas #B21 to #B28 in second receiving antenna 225 of each of N small cell base stations 200B receive data from macrocell base station 200A. The received power when each small cell base station 200B receives is, for example, substantially uniform.

In FIG. 11, one small cell base station is connected to one wireless backhaul line 20, and one radio frequency is used. Therefore, wireless backhaul lines 20 of the same number as the number of small cell base stations 200B connected to macrocell base station 200A are provided.

First wireless transmission unit 203 performs serial-to-parallel conversion (SIP) on the first transmission data sequence (data of downlink 22) included in the first transmission packet. First wireless transmission unit 203 performs a baseband process on transmission data #A51 to #A58 subjected to the serial-to-parallel conversion.

In addition, first wireless transmission unit 203 refers to history database T12 and sets an initial value of the transmission power, based on the radio frequency allocated by first radio resource management unit 208. For example, first wireless transmission unit 203 sets the transmission power whose frequency is equal to or higher than a predetermined frequency (for example, the highest) in the allocated radio frequency, as the initial value of transmission power.

First wireless transmission unit 203 may set the initial value of the transmission power, based on the RAT that can be adopted by small cell base station 200B.

When the RAT is determined, first wireless transmission unit 203 determines the number of antennas used for MIMO communication, and whether or not the directivity is formed. Here, it is determined that directivity is not formed. First wireless transmission unit 203 determines the ratio of the power to be supplied to each of antennas #A11 to #A18, based on the determined RAT (transmission power setting). Here, since the directivity is not formed, the values of the powers to be supplied to antennas #A11 to #A18 are the same.

First wireless transmission unit 203 controls the power to be supplied such that the total value of the power to be supplied to each of antennas #A11 to #A18 is the set initial value of transmission power. Therefore, here, the value obtained by dividing the transmission power by the number (8) of MIMO antennas is the power to be supplied to each antenna. In this way, the transmission power of the initial data communication is set.

First wireless transmission unit 203 starts transmission of transmission data #A51 to #A58, to small cell base station 200B through MIMO antennas #A11 to #A18, at the set transmission power, using the allocated radio resources.

In addition, as described above, first wireless transmission unit 203 supplies the transmission power determined by transmission-power control during data communication to each of antennas #A11 to #A18 of first transmitting antenna 204.

Therefore, the transmission power by first transmitting antenna 204 may be adjusted from the initial value, but the adjustment amount of the transmission-power can be reduced, by setting the initial value using the past history information of the transmission power.

Second wireless reception unit 226 receives the signal from macrocell base station 200A through each of antennas #B21 to #B28 of second receiving antenna 225. Second wireless reception unit 226 separates the received signal to obtain received data #B61 to #B68, according to a well-known signal separation algorithm. The received signal includes the data of downlink 22.

Second wireless reception unit 226 performs parallel-to-serial conversion (P/S) with respect to the received data #B61 to #B68. Reproduction data is obtained by parallel-to-serial conversion. In a case where the data is normally restored by second wireless reception unit 226, the reproduction data corresponds to the first transmission data sequence.

For example, first wireless transmission unit 203 sums (adds) the power to be supplied to each of antennas #A11 to #A18, and reflects the average value of the total value for each predetermined time (for example, 3 seconds) in history database T12. For example, first wireless transmission unit 203 updates history database T12 by adding "1" to the frequency, with respect to the transmission power that matches the RAT and the radio frequency related to the current data communication and matches the calculated average value per predetermined time. Therefore, as the communication time increases with the same transmission power, a larger value is added to the frequency of the corresponding transmission power.

According to the first control example of transmission power, since different data items are communicated in parallel, the transmission speed increases. Since the directivity pattern is not formed in the first control example, the transmission data is transmitted with equal power around macrocell base station 200A. Therefore, macrocell base station 200A can utilize MIMO to increase the transmission speed of wireless backhaul line 20.

Figure 12:
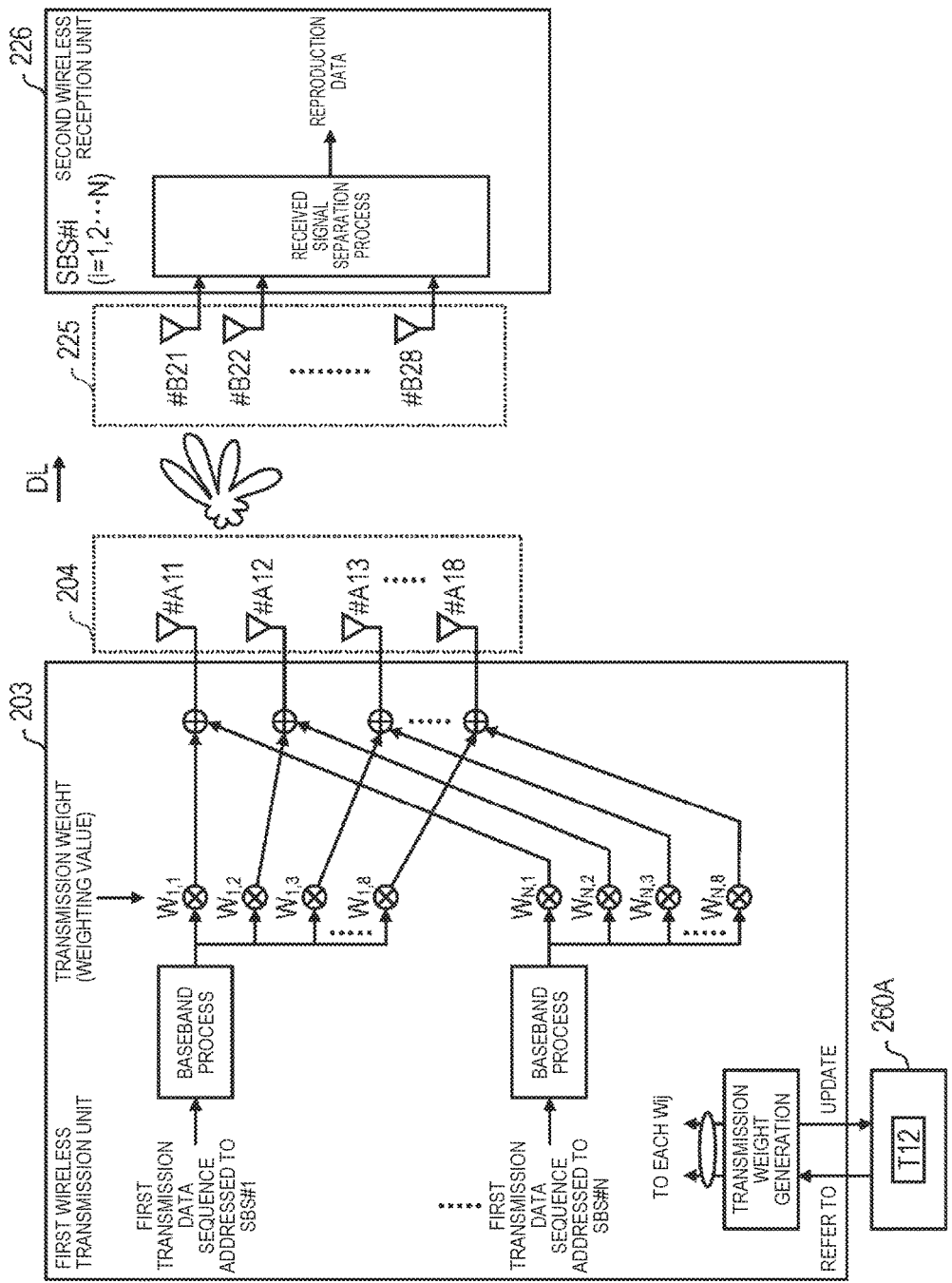
FIG. 12 is a schematic diagram for explaining a second control example of transmission power by the wireless communication system.

FIG. 12 is a schematic diagram for explaining a second control example of transmission power by wireless communication system 10. In FIG. 12, it is assumed that antennas #A11 to #A18 in first transmitting antenna 204 of macrocell base station 200A transmit the same data. In this case, antennas #B21 to #B28 in second receiving antenna 225 of each of N small cell base stations 200B receive data from macrocell base station 200A. The received power when each small cell base station 200B performs reception differs depending on the directivity, for example.

In FIG. 12, N small cell base stations are connected to one wireless backhaul line 20, and one radio frequency is used.

In FIG. 12, explanations on matters similar to those described in FIG. 11 are omitted or simplified.

First wireless transmission unit 203 refers to history database T12, and sets an initial value of the transmission power, based on the RAT for communication with small cell base station 200B and the radio frequency allocated by first radio resource management unit 208. The RAT is determined for each small cell base station 200B from the RAT that can be adopted by small cell base station 200B. For example, first wireless transmission unit 203 sets the transmission power whose frequency is equal to or higher than a predetermined frequency (for example, the highest) in the allocated radio frequency, in the RAT for communication with small cell base station 200B, as the initial value of transmission power.

When the RAT is determined, first wireless transmission unit 203 determines the number of antennas used for MIMO communication, and whether or not the directivity is formed. Here, it is determined that directivity is formed. First wireless transmission unit 203 determines the ratio (transmission weight) of the power to be supplied to each of antennas #A11 to #A18, based on the determined RAT (transmission weight generation). The ratio of the determined ratio of the power to be supplied is indicated by $W_{I,J}$. Here, "I" indicates the identifier of small cell base station 200B as the communication target, and "J" indicates the identifier of the MIMO antenna in first transmitting antenna 204.

First wireless transmission unit 203 controls the power to be supplied such that the total value of the power to be supplied to each of antennas #A11 to #A18 is the set initial value of transmission power, based on the ratio of the power to be supplied to each of antennas #A11 to #A18. As a result, the transmission power of the initial data communication is determined.

First wireless transmission unit 203 transmits transmission data included in the first transmission data sequence (data of downlink 22) addressed to each of small cell base stations 200B (SBS#1 to SBS#N) to each of antennas (#A11 to #A18). Here, the first transmission data sequence includes a data sequence to be transmitted to each of small cell base stations 200B (SBS#1 to SBS#N). At this time, first wireless transmission unit 203 performs the baseband process on each transmission data, multiplies the baseband-processed transmission data by the ratio $W_{I,J}$ of the power to be supplied, and adds the transmission data addressed to each small cell base station 200B to be transmitted to the same antenna #A11 to #A18.

First wireless transmission unit 203 starts transmission of transmission data, to each small cell base station 200B through MIMO antennas #A11 to #A18, at the determined transmission power, using the allocated radio resources.

In addition, as described above, first wireless transmission unit 203 supplies the transmission power determined by transmission-power control during data communication to each of antennas #A11 to #A18 of first transmitting antenna 204.

Second wireless reception unit 226 of each small cell base station 200B receives the signal from macrocell base station 200A through each of antennas #B21 to #B28 of second receiving antenna 225. Second wireless reception unit 226 separates the received signal to obtain reproduction data, according to a well-known signal separation algorithm. In a case where the data is normally restored by second wireless reception unit 226, the reproduction data corresponds to the first transmission data sequence.

According to the second control example of the transmission power, since the same data is communicated in parallel, macrocell base station 200A can form a directivity by beamforming and perform transmission. As the number of MIMO antennas in first transmitting antenna 204 increases, the directivity pattern becomes sharper, and macrocell base station 200A can perform transmission with an increased transmission distance. Therefore, macrocell base station 200A can improve Signal to Noise Ratio (SNR) of wireless backhaul line 20 by utilizing MIMO.

It is preferable that the number of MIMO antennas in first transmitting antenna 204 is considerably larger than the number of spatial multiplexing. Thereby, the directivity separation performance in wireless communication system 10 can be improved. The number of spatial multiplexing corresponds to the number of small cell base stations 200B connected to macrocell base station 200A.

Figure 13:
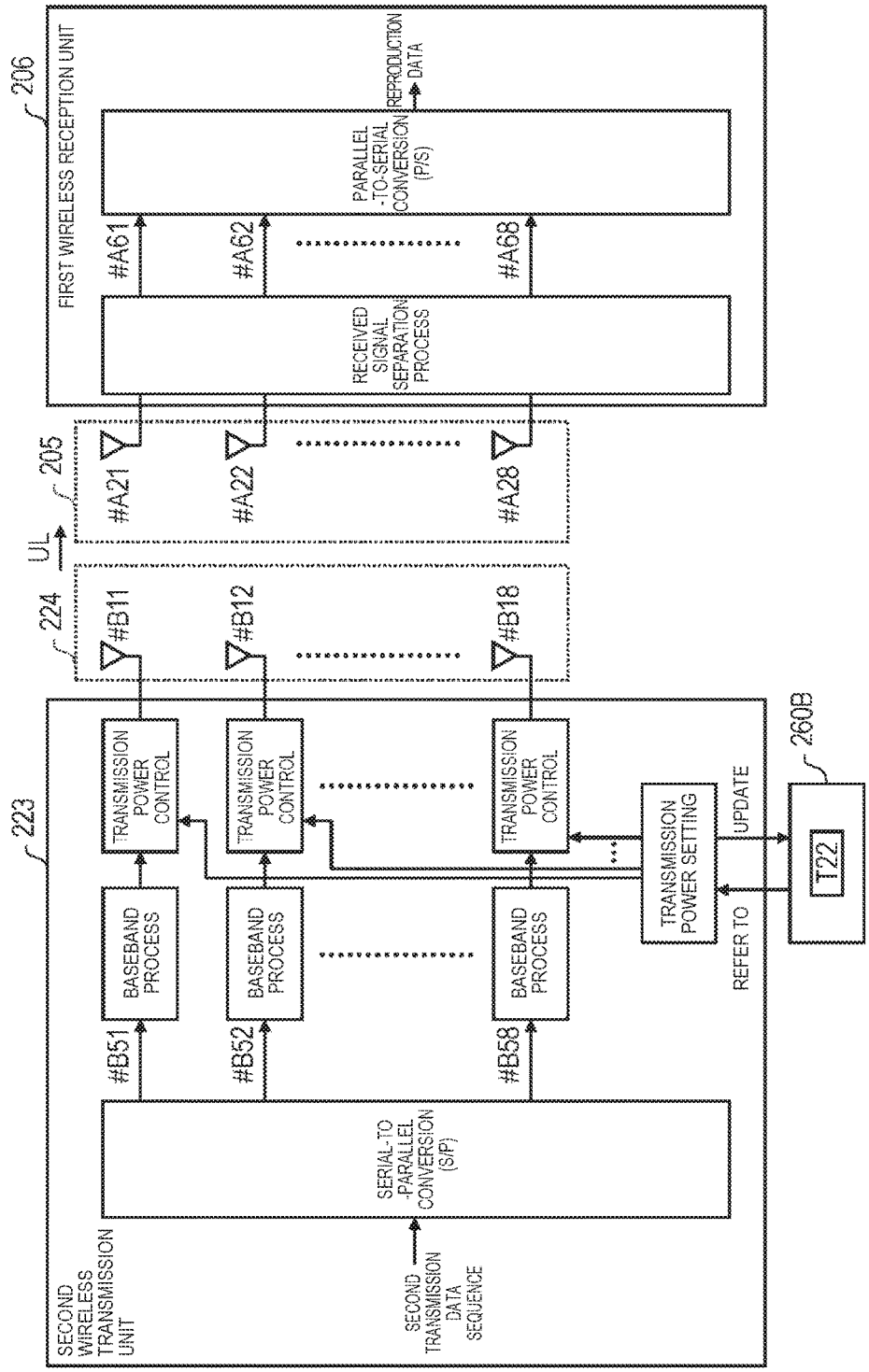
FIG. 13 is a schematic diagram for explaining a third control example of transmission power by a wireless communication system.

FIG. 13 is a schematic diagram for explaining a third control example of transmission power by wireless communication system 10. In FIG. 13, it is assumed that each of antennas #B11 to #B18 in second transmitting antenna 224 of small cell base station 200B transmits different data items. In this case, antennas #A21 to #A28 in first receiving antenna 205 of macrocell base station 200A receive data from small cell base station 200B.

Second wireless transmission unit 223 performs serial-to-parallel conversion on the second transmission data sequence (data of uplink 21) included in the second transmission packet. Second wireless transmission unit 223 performs a baseband process on transmission data #B51 to #B58 subjected to the serial-to-parallel conversion.

Second wireless transmission unit 223 refers to history database T21 and sets an initial value of the transmission power, based on the radio frequency allocated by second radio resource management unit 228. For example, second wireless transmission unit 223 sets the transmission power whose frequency is equal to or higher than a predetermined frequency (for example, the highest) in the allocated radio frequency, as the initial value of transmission power.

Second wireless transmission unit 223 may set the initial value of the transmission power, based on the RAT that can be adopted by macrocell base station 200A.

When the RAT is determined, second wireless transmission unit 223 determines the number of antennas used for MIMO communication, and whether or not the directivity is formed. Here, it is determined that directivity is not formed. Second wireless transmission unit 223 determines the ratio of the power to be supplied to each of antennas #B11 to #B18, based on the determined RAT (transmission power setting). Here, since the directivity is not formed, the values of the powers to be supplied to antennas #B11 to #B18 are the same.

Second wireless transmission unit 223 controls the power to be supplied such that the total value of the power to be supplied to each of antennas #B11 to #B18 is the set initial value of transmission power. Therefore, here, the value obtained by dividing the transmission power by the number (8) of MIMO antennas is the power to be supplied to each antenna. In this way, the transmission power of the initial data communication is set.

Second wireless transmission unit 223 starts transmission of transmission data #B51 to #B58, to macrocell base station 200A through MIMO antennas #B11 to #B18, at the determined transmission power, using the allocated radio resources.

In addition, as described above, second wireless transmission unit 223 supplies the transmission power determined by transmission-power control during data communication to each of antennas #B11 to #B18 of second transmitting antenna 224.

Therefore, the transmission power by second transmitting antenna 224 may be adjusted from the initial value, but the adjustment amount of the transmission-power can be reduced, by setting the initial value using the past history information of the transmission power.

First wireless reception unit 206 receives a signal from small cell base station 200B through each of antennas #A21 to #A28 in first receiving antenna 205. First wireless reception unit 206 separates the received signal to obtain received data #A61 to #A68, according to a well-known signal separation algorithm. The received signal includes the data of uplink 21.

First wireless reception unit 206 performs parallel-to-serial conversion on received data #A61 to #A68. Reproduction data is obtained by parallel-to-serial conversion. In a case where the data is normally restored by first wireless reception unit 206, the reproduction data corresponds to the second transmission data sequence.

For example, second wireless transmission unit 223 sums (adds) the power to be supplied to each of antennas #B11 to #B18, and reflects the average value of the total value for each predetermined time (for example, 3 seconds) in history database T22. For example, second wireless transmission unit 223 updates history database T22 by adding "1" to the frequency, with respect to the transmission power that matches the RAT and the radio frequency related to the current data communication and matches the calculated average value per predetermined time. Therefore, as the communication time increases with the same transmission power, a larger value is added to the frequency of the corresponding transmission power.

According to the third control example of transmission power, since different data items are communicated in parallel, the transmission speed increases. Since the directivity pattern is not formed in the third control example, the transmission data is transmitted with equal power around small cell base station 200B. Therefore, small cell base station 200B can utilize MIMO to increase the transmission speed of wireless backhaul line 20.

Figure 14:
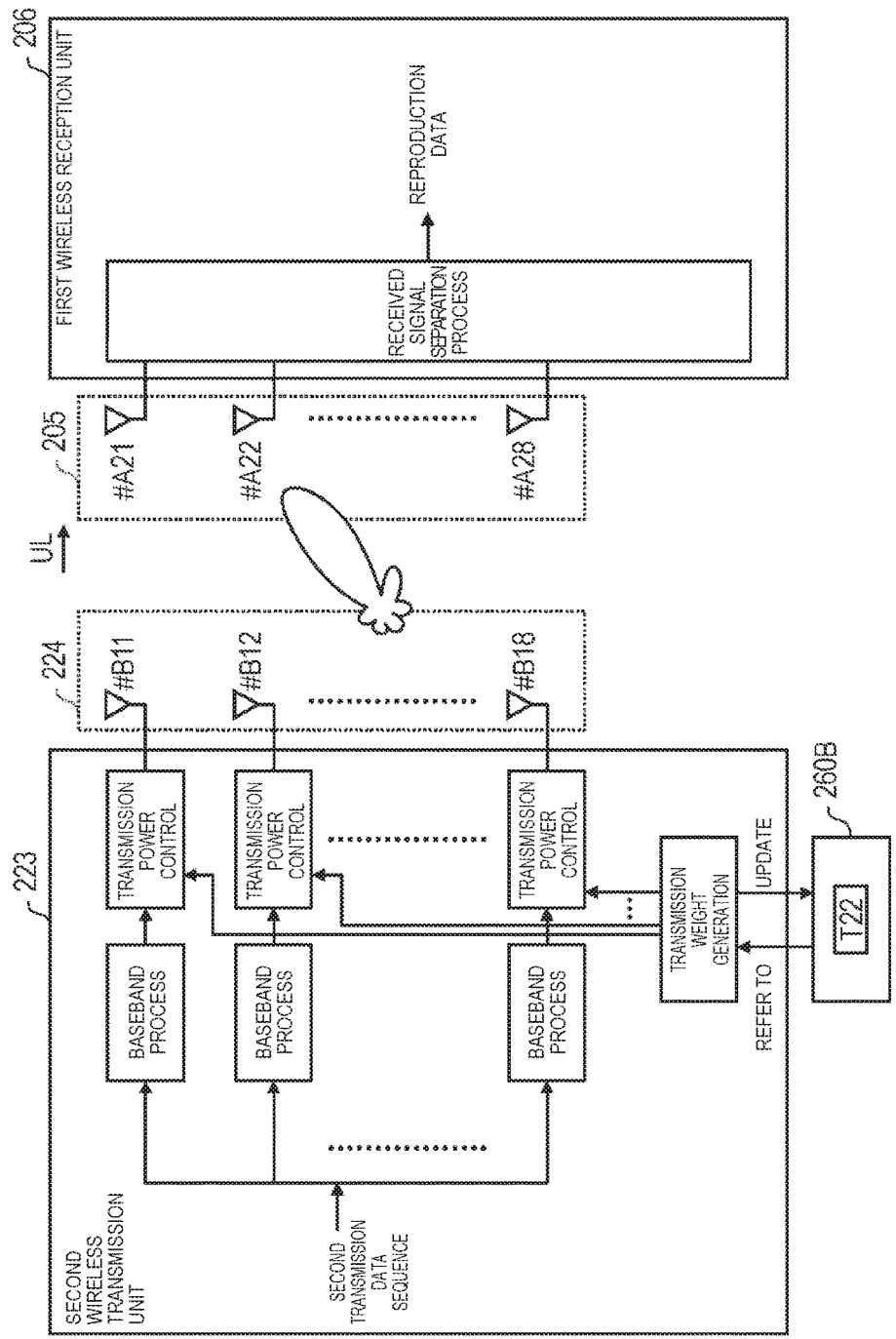
FIG. 14 is a schematic diagram for explaining a fourth control example of transmission power by a wireless communication system.

FIG. 14 is a schematic diagram for explaining a fourth control example of transmission power by wireless communication system 10. In FIG. 14, it is assumed that each of antennas #B11 to #B18 in second transmitting antenna 224 of small cell base station 200B transmits the same data. In this case, antennas #A21 to #A28 in first receiving antenna 205 of macrocell base station 200A receive data from small cell base station 200B.

In FIG. 14, explanations on matters similar to those described in FIG. 12 are omitted or simplified.

Second wireless transmission unit 223 refers to history database T22, and sets an initial value of the transmission power, based on the RAT for communication with macrocell base station 200A and the radio frequency allocated by second radio resource management unit 228. The RAT is determined from among the RATs that can be adopted by macrocell base station 200A. For example, second wireless transmission unit 223 sets the transmission power whose frequency is equal to or higher than a predetermined frequency (for example, the highest) in the allocated radio frequency, in the RAT for communication with macrocell base station 200A, as the initial value of transmission power.

When the RAT is determined, second wireless transmission unit 223 determines the number of antennas used for MIMO communication, and whether or not the directivity is formed. Here, it is determined that directivity is formed. Second wireless transmission unit 223 determines the ratio (transmission weight) of the power to be supplied to each of antennas #B11 to #B18, based on the determined RAT (transmission weight generation).

Second wireless transmission unit 223 controls the power to be supplied such that the total value of the power to be supplied to each of antennas #B11 to #B18 is the set initial value of transmission power, based on the ratio of the power to be supplied to each of antennas #B11 to #B18. Thus, the transmission power of the initial data communication is determined.

Second wireless transmission unit 223 transmits the transmission data included in the second transmission data sequence (data of uplink 21) to each of antennas #B11 to #B18. At this time, second wireless transmission unit 223 performs a baseband process on each transmission data and multiplies the ratio of power to be supplied.

Second wireless transmission unit 223 starts transmission of transmission data, to macrocell base station 200A through MIMO antennas #B11 to #B18, at the determined transmission power, using the allocated radio resources.

In addition, as described above, second wireless transmission unit 223 supplies the transmission power determined by transmission-power control during data communication to each of antennas #B11 to #B18 of second transmitting antenna 224.

First wireless reception unit 206 of macrocell base station 200A receives the signal from small cell base station 200B through each of antennas #A21 to #A28 of first receiving antenna 205. First wireless reception unit 206 separates the received signal to obtain reproduction data, according to a well-known signal separation algorithm. In a case where the data is normally restored by first wireless reception unit 206, the reproduction data corresponds to the second transmission data sequence.

According to the fourth control example of the transmission power, since the same data is communicated in parallel, small cell base station 200B can form a directivity by beamforming and perform transmission. As the number of MIMO antennas in second transmitting antenna 224 increases, the directivity pattern becomes sharper, and small cell base station 200B can perform transmission with an increased transmission distance. Therefore, small cell base station 200B can utilize MIMO to increase the SNR of wireless backhaul line 20.

Effects and the Like

As described above, base station 200 retains history database T11 or T21 retaining information on the usage history of the radio frequency related to communication with another base station 200. When it is necessary to set wireless backhaul line 20, base station 200 refers to history database T11 or T21 to determine the priority of the allocation of the radio frequency, and allocates the radio resource (radio frequency, or a part of radio frequency) related to data communication.

Thus, even in a case where the backhaul line is wireless rather than a wired line such as an optical line, radio resources to be used for communication can be dynamically determined. Therefore, in wireless communication system 10, an optical line may not be added every time base station 200 (for example, small cell base station 200B) is added, the cost required for installation of the base station can be reduced, and the speed of the base station installation can be improved.

Furthermore, it is not necessary to preliminarily allocate a radio frequency to each wireless backhaul line 20 in wireless communication system 10, and it is possible to suppress a specific radio frequency from being used too much or too small. Therefore, base station 200 can improve the utilization efficiency of radio resources. Since the radio frequency is not fixedly allocated in advance, it is possible to reduce the shortage of usable radio frequency.

Base station 200 can omit the detection process of enormous amount of line quality information for determining the communication environment using the radio frequency. This line quality information includes, for example, Signal to Interference Noise Ratio (SINR).

A radio frequency with a high past communication history (for example, a large amount of communication) indicates a radio frequency with a relatively low communication interference with the adjacent base stations, by base station 200 adopting the radio frequency. Therefore, it is preferable that such radio frequency is allocated for communication with another base stations 200 over wireless backhaul line 20.

Since the amount of data accumulated increases in the radio frequencies frequently used in the past, the possibility that the radio frequencies are selected as candidates increases. In the radio frequency which was frequently used in the past, the possibility of successful communication between base stations 200 will be also high in the future. Therefore, base station 200 can improve the communication accuracy in communication with the another base station 200 over wireless backhaul line 20, and reduce the necessity of reallocation of radio resources. Therefore, base station 200 can improve the allocation efficiency of radio resources.

Base station 200 can suppress the occurrence of the interference between communications using the same radio frequency, by taking into consideration of the past communication history, without using the beamforming technique or the massive MIMO (M-MIMO) technique. Even in a case where the number of installed base stations 200 in wireless communication system 10 increases and the communication interference increases with the beam forming technique or the M-MIMO technique, base station 200 can reduce an increase in communication interference by considering the past communication history.

Since base station 200 derives the allocation candidates for the radio frequency according to the past usage history using each radio frequency, it is not necessary to know which radio frequency is allocated to another base station 200. Therefore, base station 200 does not need to know which communication carrier owns another base station 200. Therefore, even in a case where a plurality of base stations of the same communication carrier communicate over wireless backhaul line 20, or a plurality of base stations of different communication carriers communicate over wireless backhaul line 20, base station 200 can allocate a radio frequency with less interference to base station 200 of the communication partner easily and with high accuracy.

In a case where Time Division Duplex (TDD) is adopted for wireless backhaul line 20, if the synchronization between plural base stations 200 and the allocation patterns of the radio resources in uplink 21 and downlink 22 are not unified, communication interference is likely to occur. In TDD, uplink 21 and downlink 22 are time-divided with the same carrier frequency. In particular, compared to the communication between base station 200 and a mobile terminal (for example, terminal 100), communication interference is steadily generated among base stations 200 installed at fixed positions, so it becomes more difficult to avoid communication interference On the other hand, according to wireless communication system 10, the occurrence of communication interference can be suppressed by allocating the radio frequency according to the past record.

Therefore, even if the backhaul line is a heterogeneous network and a wireless line, base station 200 can reduce the occurrence of communication interference (inter-cell interference) among plural base stations 200, and suppress frequent occurrence of a radio resource allocation process for data retransmission.

Base station 200 retains history database T12 or T22 retaining information on the usage history of the transmission power for each radio frequency related to communication with another base station 200. When the setting of wireless backhaul line 20 is necessary, base station 200 refers to history database T12 or T22 and sets the provisional value (initial value) of transmission power related to data communication.

Thus, even in a case where the backhaul line is wireless rather than a wired line such as an optical line, the transmission power to be used for communication can be dynamically determined. Therefore, in wireless communication system 10, even if base station 200 (for example, small cell base station 200B) is added, occurrence of communication interference between adjacent base station 200 and base station 200 can be suppressed.

Base station 200 does not need to allocate transmission power more than necessary for communication over wireless backhaul line 20, and can suppress the occurrence of communication interference due to the use of excessive transmission power. Base station 200 allocates excessively small transmission power by considering communication interference excessively, for communication over wireless backhaul line 20, thereby suppressing degradation of communication quality.

The transmission power in which the past communication history is high (for example, frequency is high) indicates that the communication interference with the adjacent base stations is relatively small and the communication success rate is high. Therefore, it is preferable that such transmission power is allocated for communication with another base stations 200 over wireless backhaul line 20.

Since the transmission power which was frequently used in the past has a high usage frequency, the transmission is highly likely to be used. In the transmission power frequently used in the past, there is little excess or deficiency of the transmission power in the communication among base stations 200 in the future, and the possibility of successful communication is high. Therefore, even if the backhaul line is a heterogeneous network and a wireless line, base station 200 can reduce the occurrence of communication interference among plural base stations 200, thereby improving communication accuracy.

Since base station 200 sets the transmission power according to the past usage history using each transmission power, there is no need to know how much transmission power is set in another base station 200. Therefore, base station 200 does not need to know which communication carrier owns another base station 200. Therefore, even in a case where a plurality of base stations of the same communication carrier communicate over wireless backhaul line 20, or a plurality of base stations of different communication carriers communicate over wireless backhaul line 20, base station 200 can perform data communication with less interference with base station 200 of the communication partner easily and with high accuracy.

Similarly to the case of radio frequency allocation, even in a case where TDD is adopted for wireless backhaul line 20, wireless communication system 10 can set the transmission power according to past record, thereby suppressing the occurrence of communication interference.

In this way, base station 200 can accurately determine which radio frequency is to be allocated and a size of transmission power to be set. Base station 200 can improve the allocation efficiency and the utilization efficiency of radio resources for communicating data over wireless backhaul line 20. Base station 200 can suppress an increase in communication interference in wireless backhaul line 20, even if the number of installed base stations 200 increases.

Other Exemplary Embodiments

As described above, the first exemplary embodiment has been described as an example of the technique of the present disclosure. However, the technique of the present disclosure is not limited to this, and can also be applied to exemplary embodiments in which change, substitution, addition, omission, or the like is performed.

In the first exemplary embodiment, base station 200 may acquire information on the communication amount related to the history and information on the reset of the history through the interface (not shown). Examples of the interface include a user interface (UI) that accepts information relating to the usage history from a user, or a communication interface that receives information on the usage history set by an external device. In this case, first radio resource management unit 208 and second radio resource management unit 228 may increase or decrease the communication amount of the specific radio frequency related to the usage history, or increase or decrease the frequency of the specific transmission power related to the usage history, for example, based on the acquired information.

For example, base station 200 and other devices may periodically calculate a radio frequency or transmission power which is suitable for communication over wireless backhaul line 20 by simulation or the like in offline. Base station 200 may acquire the calculation result, and reflect it in history databases T11, T12, T21, and T22.

Thus, in history databases T11, T12, T21, and T22, even in a case where the usage history of the suboptimal radio frequency and transmission power increases rather than the optimum radio frequency and transmission power, it is possible to increase the history of more suitable radio frequency and transmission power, and it is possible to escape the suboptimal state. That is, the usage history accumulated in history databases T11, T12, T21, and T22 can be refreshed. This allows base station 200 to slightly modify the accumulation of automatic usage history and promote more suitable radio frequency and transmission power to be used. Base station 200 can redistribute radio resources and transmission power.

In the first exemplary embodiment, history databases T11 and T12 may be retained by small cell base station 200B. History databases T21 and T22 may be retained by macrocell base station 200A. In this case, macrocell base station 200A and small cell base station 200B may transmit and receive the information on the radio frequency or the usage history of the transmission power, by using a control signal or the like.

The first exemplary embodiment illustrates that macrocell base station 200A allocates the radio frequency of downlink 22, and small cell base station 200B allocates the radio frequency of uplink 21. Macrocell base station 200A and small cell base station 200B may cooperate to determine the allocated radio frequency.

In the first exemplary embodiment, base station 200 assumes that the number of MIMO antennas is 8, but the number may be 7 or less, or 9 or more.

In the first exemplary embodiment, the first control example of the transmission power exemplifies that first wireless transmission unit 203 transmits different data items without forming directivity, however, different directivities may be formed and different data may be transmitted. In this case, first wireless transmission unit 203 supplies power to each of antennas #A11 to #A18 of MIMO at different ratios, similarly to the second control example of the transmission power.

In the first exemplary embodiment, the third control example of the transmission power exemplifies that second wireless transmission unit 223 transmits different data items without forming directivity, however, different directivities may be formed and different data may be transmitted. In this case, second wireless transmission unit 223 supplies power to each of antennas #B11 to #B18 of MIMO at different ratios, similarly to the fourth control example of the transmission power.

In the first exemplary embodiment, it is described that history databases T11 and T21 hold the information on the usage history of the radio frequency with another base station in the past certain period, but the information on the usage history of the radio frequency may be accumulated regardless of the period. Although it is described that history databases T12 and T22 retain the information on the usage history of the transmission power with another base station in the past certain period, but the information on the usage history of the transmission power may be accumulated regardless of the period.

The first exemplary embodiment illustrates that the accumulated value of the communication amount for each radio frequency is used as the information on the usage history of the radio frequency, but information on another usage history may be used. The other usage history information includes, for example, the total communication time (total connection time) and the number of times of communication (the number of times of connection) related to the communication between base stations 200 using radio frequencies. For example, the longer the total communication time or the higher the number of times of communication, the higher the priority of selecting the radio frequency.

The first exemplary embodiment illustrates that the accumulated value of the frequency of each transmission power is used as the information on the usage history of the transmission power, but information on another usage history may be used. The other usage history information includes, for example, the total communication time (total connection time) and the number of times of communication (the number of times of connection) related to the communication between base stations 200 using the set transmission power. For example, the longer the total communication time or the higher the number of times of communication, the higher the priority of transmission power being selected as the initial value.

In the first exemplary embodiment, history databases T11 and T21 may be provided separately from various viewpoints. For example, history databases T11 and T21 may be provided separately for each time zone in which radio resources are allocated. In addition, history databases T11 and T21 may be provided separately by other known methods. Thus, base station 200 can determine the allocation candidate for the radio frequency according to the usage history of the radio frequency considering various trends.

In the first exemplary embodiment, history databases T12 and T22 may be provided separately from various viewpoints. For example, history databases T21 and T22 may be provided separately for each time zone in which transmission power is set. In addition, history databases T21 and T22 may be provided separately by other known methods. Thus, base station 200 can determine the initial value of the transmission power according to the usage history of the transmission power considering various trends.

The first exemplary embodiment illustrates that base station 200 manages the usage history of the communication amount for each radio frequency as a radio resource to determine the candidate for the radio frequency to be used for communication over wireless backhaul line 20 with different base station 200. Base station 200 may manage the usage history of the communication amount for each time slot (range on the time axis) on a certain radio frequency instead of the radio frequency to determine the candidate for the time slot which is the radio resource to be used for communication with different base station 200. Base station 200 may manage the usage history of the communication amount for each combination of the radio frequency and the time slot (range on the time axis) on the radio frequency to determine a candidate for the combination of the radio frequency and the time slot, which is the radio resource to be used for communication with different base station 200.

For example, in a case where there is one radio frequency (f1) and the radio frequency is divided into 16 time slots (TS), base station 200 may manage and update the usage history of the past communication amount for each of 16 radio resources f1-TS1, f1-TS2, . . . , and f1-TS16. Thus, base station 200 can segregate the radio resources (here, the time slot) from adjacent base stations.

For example, in a case where there are two radio frequencies (f1 and f2) and each radio frequency is divided into 10 time slots, base station 200 may manage and update the usage history of the past communication amount for each of 20 radio resources f1-TS1, f1-TS2, . . . , and f1-TS10, and f2-TS1, f2-TS2, . . . , and f2-TS10. Thus, base station 200 can segregate the radio resources (here, the combination of the radio frequency and the time slot) with an adjacent base station.

In the first exemplary embodiment, macrocell base station 200A and small cell base station 200B connected over wireless backhaul line 20 are illustrated. The first exemplary embodiment can be applied to all communication devices communicating over wireless backhaul line 20 in the heterogeneous network. For example, the present disclosure can also be applied to a case where the line between the surveillance camera and the monitoring center is wireless, a radio resource to be used and an initial value of transmission power are determined.

In the first exemplary embodiment, processor 250 (250A, 250B) may be physically configured in any way. However, if a programmable processor is used, since processing contents can be changed by changing programs, the degree of freedom in designing processor 250 can be increased. Processor 250 may be configured with one semiconductor chip or physically a plurality of semiconductor chips. In the case where processor 250 is configured with a plurality of semiconductor chips, each control in the first exemplary embodiment may be realized by separate semiconductor chips. In this case, one processor 250 may be configured with the plurality of semiconductor chips. In addition, processor 250 may be formed of a member (such as a capacitor) having a function different from that of the semiconductor chip. Further, one semiconductor chip may be configured so as to realize the functions of processor 250 and other functions.

In the first exemplary embodiment, the configuration of base station 200 is shown in FIG. 2, FIG. 11 to FIG. 14, but each configuration may be realized by hardware, or may be realized by software.

Outline of Exemplary Embodiment of Present Disclosure

As described above, base station 200 according to the above exemplary embodiment communicates with another base station 200 over wireless backhaul line 20 in which a plurality of wireless communication schemes are mixed and used. Base station 200 includes processor 250 and an antenna. Processor 250 allocates a radio frequency related to data communication with another base station 200, based on information on the usage history of the radio frequency related to data communication with another base station 200. The antenna communicates data with another base station 200 using the allocated radio frequency.

Base station 200 is an example of a wireless communication device. The antennas are, for example, first transmitting antenna 204, second transmitting antenna 224, first receiving antenna 205, or second receiving antenna 225.

Thus, base station 200 can reduce the occurrence of communication interference with adjacent base station 200. For example, base station 200 can suppress communication interference, even if a large number of base stations 200 (for example, small cell base station 200B) are added. Since the backhaul line is wireless, the cost of adding base station 200 can be reduced, economical efficiency can be improved, and the speed of installation can also be improved. Base station 200 can reduce the number of repetitions of the radio resource allocation operation, thereby reducing the time required for radio resource allocation of base station 200. That is, base station 200 can improve the allocation efficiency of radio resources. Base station 200 can improve the utilization efficiency of radio resources without dividing the frequency between plural base stations 200 in advance.

Base stations 200 may be configured with only the base stations of the same communication carrier, or may be configured such that the same radio resource is shared by the base stations of different plural communication carriers. In either configuration, base station 200 can allocate radio resources for communication over wireless backhaul line 20 without mutual information sharing between plural base stations 200.

Base station 200 may include memory 260 that stores information on the usage history of radio frequencies for data communication with different base station 200. Processor 250 may update the information on the usage history stored in memory 260, based on the radio frequency used for data communication by an antenna, and the usage history of the radio frequency.

Thus, each time base station 200 performs data communication over wireless backhaul line 20, the latest usage history of radio resource can be reflected. Thus, base station 200 can improve the allocation efficiency and utilization efficiency of radio resources.

Processor 250 may preferentially allocate the radio frequency with high usage history, with respect to the radio frequency related to data communication with another base station 200.

Thus, base station 200 can allocate radio resources in which the possibility of successful data communication is high, thereby improving the data communication accuracy.

The information on the usage history of the radio frequency may include data communication amount using the radio frequency, data communication time using the radio frequency, or the number of times of data communication using the radio frequency.

Processor 250 may derive the allocation candidate for the radio frequency related to data communication with another base station 200, based on the usage history of the radio frequency related to data communication with another base station 200. Processor 250 may allocate another radio frequency in a case where the allocation-candidate radio frequency cannot be allocated. The antenna communicates data with another base station 200 using another radio frequency.

Thus, even in a case where there is no available allocation-candidate radio frequency, base station 200 can re-designate other radio frequencies, thereby improving the probability that data communication with base station 200 will succeed.

Base station 200 may be provided with an interface for acquiring change information for changing the usage history of the radio frequency. Processor 250 may change the usage history of the radio frequency based on the change information.

As a result, the usage history (usage record) of the radio frequency is high, but even in a case where the radio frequency is not optimal overall (suboptimal case), base station 200 can intentionally refresh the usage history and exit the convergence to the suboptimal state.

The frequency allocation method of the above exemplary embodiment is a frequency allocation method in base station 200 that communicates with another base station 200 over wireless backhaul line 20 in which a plurality of wireless communication schemes are mixed and used. In this frequency allocation method, a radio frequency related to data communication with another base station 200 is allocated, based on the information on the usage history of the radio frequency related to data communication with another base station 200, and data communication with another base station 200 is performed using the allocated radio frequency.

Thus, base station 200 can reduce the occurrence of communication interference with adjacent base station 200. For example, base station 200 can suppress communication interference, even if a large number of base stations 200 (for example, small cell base station 200B) are added. Since the backhaul line is wireless, the cost of adding base station 200 can be reduced, economical efficiency can be improved, and the speed of installation can also be improved. Base station 200 can reduce the number of repetitions of the radio resource allocation operation, thereby reducing the time required for radio resource allocation of base station 200. That is, base station 200 can improve the allocation efficiency of radio resources. Base station 200 can improve the utilization efficiency of radio resources without dividing the frequency between plural base stations 200 in advance.

Base station 200 in the above exemplary embodiment includes processor 250 that sets the initial value of the transmission power related to data communication with different base station 200, based on information on the usage history of transmission power related to data communication with different base station 200, and an antenna that performs data communication with different base station 200, based on the set initial value of transmission power.

Thus, base station 200 can reduce the occurrence of communication interference with adjacent base station 200. For example, base station 200 can suppress communication interference, even if a large number of base stations 200 (for example, small cell base station 200B) are added. Since the backhaul line is wireless, the cost of adding base station 200 can be reduced, economical efficiency can be improved, and the speed of installation can also be improved. Since base station 200 refers to the example of past communication success by the own station, the probability of allocating an excessively large transmission power by the own station as an initial value is reduced, and occurrence of communication interference can be suppressed. Since base station 200 refers to the example of past communication success by the own station, the probability of allocating an excessively small transmission power as an initial value is reduced, and degradation of communication quality can be suppressed.

Base station 200 may include memory 260 that stores information on the usage history of transmission power related to data communication with different base station 200. Processor 250 may update the information on the usage history of the transmission power accumulated in memory 260, based on the transmission power used for data communication by an antenna.

Thus, every time base station 200 performs data communication over wireless backhaul line 20, the usage history of the latest transmission power can be reflected. Thus, base station 200 can suppress an increase in communication interference, even if the number of installed base stations 200 increases.

Processor 250 may preferentially set transmission power with high usage history, with respect to the transmission power related to data communication with different base station 200.

Thus, base station 200 can set transmission power in which the possibility of successful data communication is high, thereby improving the data communication accuracy.

Further, the antenna may include a plurality of antennas. Processor 250 may control power to be supplied to each of the plurality of antennas, for the plurality of antennas, based on a wireless communication scheme adopted by another base station 200 and the set initial value of transmission power. The plurality of antennas is, for example, MIMO antennas #A11 to #A18 and #B11 to #B18.

Thus, base station 200 can form the directivity related to the data communication determined by the wireless communication scheme. Even in a case of forming the directivity, base station 200 can maintain the transmission power appropriately and control the communication interference over wireless backhaul line 20.

The information on the usage history of transmission power may include information on transmission power at a radio frequency allocated to the data communication, and information on a frequency of data communication using the transmission power.

The information on the transmission power may include information on average power of transmission power used for the data communication, per a predetermined time.

This makes it less susceptible to noise or the like generated in a short time during data transmission, and improves the setting accuracy of the initial value of transmission power.

Base station 200 may be provided with interface for acquiring change information for changing the usage history of transmission power. Processor 250 may change the usage history of the transmission power based on the change information.

As a result, the usage history (record) of the transmission power is high, but even in a case where the transmission power is not optimal overall (suboptimal case), base station 200 can intentionally refresh the usage history and exit the convergence to the suboptimal state.

The transmission-power setting method of the above exemplary embodiment is a transmission-power setting method in base station 200 that communicates with another base station 200 over wireless backhaul line 20 in which a plurality of wireless communication schemes are mixed and used. In this method, the initial value of transmission power related to data communication with different base station 200 is set based on information on the usage history of transmission power related to data communication with different base station 200, and data is communicated with different base station 200, based on the set initial value of transmission power.

Thus, base station 200 can reduce the occurrence of communication interference with adjacent base station 200. For example, base station 200 can suppress communication interference, even if a large number of base stations 200 (for example, small cell base station 200B) are added. Since the backhaul line is wireless, the cost of adding base station 200 can be reduced, economical efficiency can be improved, and the speed of installation can also be improved. Since base station 200 refers to the example of past communication success by the own station, the probability of allocating an excessively large transmission power by the own station as an initial value is reduced, and occurrence of communication interference can be suppressed. Since base station 200 refers to the example of past communication success by the own station, the probability of allocating an excessively small transmission power as an initial value is reduced, and degradation of communication quality can be suppressed.

INDUSTRIAL APPLICABILITY

The present disclosure is useful for a wireless communication device, a transmission-power setting method, and the like, which are capable of suppressing an increase in communication interference in wireless communication over a backhaul line, even if the number of installed wireless communication devices is increased.

REFERENCE MARKS IN THE DRAWINGS

10 WIRELESS COMMUNICATION SYSTEM
21 UPLINK
22 DOWNLINK
100 TERMINAL
200 BASE STATION
200A MACROCELL BASE STATION
200B SMALL CELL BASE STATION
201 FIRST INTERFACE
202 FIRST PACKET GENERATION UNIT
203 FIRST WIRELESS TRANSMISSION UNIT
204 FIRST TRANSMITTING ANTENNA
205 FIRST RECEIVING ANTENNA
206 FIRST WIRELESS RECEPTION UNIT
207 FIRST PACKET DECODING UNIT
208 FIRST RADIO RESOURCE MANAGEMENT UNIT
221 SECOND INTERFACE
222 SECOND PACKET GENERATION UNIT
223 SECOND WIRELESS TRANSMISSION UNIT
224 SECOND TRANSMITTING ANTENNA
225 SECOND RECEIVING ANTENNA
226 SECOND WIRELESS RECEPTION UNIT
227 SECOND PACKET DECODING UNIT
228 SECOND RADIO RESOURCE MANAGEMENT UNIT
250, 250A, 250B PROCESSOR
260, 260A, 260B MEMORY
300 HIGHER-LEVEL DEVICE
T11, T12, T21, T22 HISTORY DATABASE

The invention claimed is:

1. A wireless communication base station, which communicates with a different wireless communication base station over a wireless backhaul line in which a plurality of wireless communication schemes are mixed and used, comprising:
a processor that,
allocates a radio frequency to establish the wireless backhaul line over which to communicate with the different wireless communication base station,
prior to commencing data communication with the different wireless communication base station, sets an initial value of transmission power related to the data communication with the different wireless communication base station at the allocated radio frequency, based on information on usage history of transmission power related to the data communication with the different wireless communication base station, wherein the information on usage history includes a record of transmission power used in prior data communication with the different wireless communication base station; and an antenna that performs data communication with the different wireless communication base station, based on the set initial value of transmission power,
wherein, the processor, in operation,
performs transmission power control to adjust the transmission power during the data communication based on information on reception power notified from the different wireless communication base station; and
updates the information on usage history of transmission power at the allocated radio frequency based on information on the transmission power used for the data communication.

2. The wireless communication base station of claim 1, further comprising:
a memory that stores the information on usage history of transmission power related to the data communication with the different wireless communication base station.

3. The wireless communication base station of claim 1, wherein the processor preferentially sets transmission power with high usage history, with respect to transmission power related to the data communication with the different wireless communication base station.

4. The wireless communication base station of claim 1, wherein the antenna includes a plurality of antennas, and wherein the processor controls power to be supplied to each of the plurality of antennas, for the plurality of antennas, based on a wireless communication scheme adopted by the different wireless communication base station and the set initial value of transmission power.

5. The wireless communication base station of claim 1, wherein the information on usage history of transmission power includes information on a frequency of data communication using the transmission power.

6. The wireless communication base station of claim 5, wherein the information on transmission power includes information on average power of transmission power used for the data communication, per a predetermined time.

7. The wireless communication base station of claim 1, further comprising:
an interface for acquiring change information for changing the usage history of transmission power,
wherein the processor changes the usage history of transmission power, based on the change information.

8. A transmission-power setting method of a wireless communication base station, which communicates with a different wireless communication base station over a wireless backhaul line in which a plurality of wireless communication schemes are mixed and used, the method comprising:
allocates a radio frequency to establish the wireless backhaul line over which to communicate with the different wireless communication base station;
setting, prior to commencing data communication with the different wireless communication base station, an initial value of transmission power related to the data communication with the different wireless communication base station at the allocated radio frequency, based on information on usage history of transmission power related to the data communication with the different wireless communication base station, wherein the information on usage history includes a record of transmission power used in prior data communication with the different wireless communication base station;
performing data communication with the different wireless communication base station, based on the set initial value of transmission power;
performing transmission power control to adjust the transmission power during the data communication based on information on reception power notified from the different wireless communication base station; and
updating the information on usage history of transmission power at the allocated radio frequency based on information on the transmission power used for the data communication.

9. The wireless communication base station of claim 2, wherein the processor preferentially sets transmission power with high usage history, with respect to transmission power related to the data communication with the different wireless communication base station.

10. The wireless communication base station of claim 2, wherein the antenna includes a plurality of antennas, and wherein the processor controls power to be supplied to each of the plurality of antennas, for the plurality of antennas, based on a wireless communication scheme adopted by the different wireless communication base station and the set initial value of transmission power.

11. The wireless communication base station of claim 2, wherein the information on usage history of transmission power includes information on a frequency of data communication using the transmission power.

12. The wireless communication base station of claim 11, wherein the information on transmission power includes information on average power of transmission power used for the data communication, per a predetermined time.

13. The wireless communication base station of claim 2, further comprising:
an interface for acquiring change information for changing the usage history of transmission power,
wherein the processor changes the usage history of transmission power, based on the change information.

14. The wireless communication base station of claim 3, wherein the antenna includes a plurality of antennas, and wherein the processor controls power to be supplied to each of the plurality of antennas, for the plurality of antennas, based on a wireless communication scheme adopted by the different wireless communication base station and the set initial value of transmission power.

15. The wireless communication device base station of claim 3,
wherein the information on usage history of transmission power includes information on a frequency of data communication using the transmission power.

16. The wireless communication base station of claim 1, wherein the processor allocates the radio frequency to establish the wireless backhaul line, over which to communicate with the different wireless communication base station, when a terminal is present under control of the different wireless communication base station.

17. The wireless communication base station of claim 1, wherein the processor allocates the radio frequency by setting an initial value of the radio frequency based on information on usage history of radio frequency related to the data communication with the different wireless communication base station, wherein the information on usage history includes a record of radio frequency used in prior data communication with the different wireless communication base station.

18. The wireless communication base station of claim 17, wherein the processor preferentially allocates radio frequency with high usage history to the wireless backhaul line over which to communicate with the different wireless communication base station.

19. The wireless communication base station of claim 17, wherein the processor updates the information on usage history of radio frequency based on information on the radio frequency used for the data communication.

20. The wireless communication base station of claim 19, wherein the processor updates the information on usage history of radio frequency based on information on radio frequency unusable for the data communication.

* * * * *